US011513958B1

(12) United States Patent
Mukherjee

(10) Patent No.: US 11,513,958 B1
(45) Date of Patent: *Nov. 29, 2022

(54) SHARED MID-LEVEL DATA CACHE

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 94 days.

This patent is subject to a terminal disclaimer.

(21) Appl. No.: 17/081,140

(22) Filed: Oct. 27, 2020

Related U.S. Application Data

(63) Continuation-in-part of application No. 16/425,435, filed on May 29, 2019, now Pat. No. 11,327,890.

(60) Provisional application No. 62/944,269, filed on Dec. 5, 2019.

(51) Int. Cl.
*G06F 12/08* (2016.01)
*G06F 12/0846* (2016.01)
*G06F 12/0871* (2016.01)
*G06F 12/14* (2006.01)
*G06F 12/0895* (2016.01)
*G06F 12/02* (2006.01)
*G06F 12/0891* (2016.01)

(52) U.S. Cl.
CPC ...... *G06F 12/0848* (2013.01); *G06F 12/0246* (2013.01); *G06F 12/0871* (2013.01); *G06F 12/0891* (2013.01); *G06F 12/0895* (2013.01); *G06F 12/1491* (2013.01)

(58) Field of Classification Search
CPC ............. G06F 12/0848; G06F 12/0246; G06F 12/0871; G06F 12/0891; G06F 12/08995; G06F 12/1491
See application file for complete search history.

(56) References Cited

U.S. PATENT DOCUMENTS

| 5,809,530 | A | 9/1998 | Samra et al. |
| 6,131,155 | A | 10/2000 | Alexander et al. |
| 6,629,209 | B1 | 9/2003 | Arimilli et al. |
| 7,403,887 | B1 | 7/2008 | Bishop et al. |

(Continued)

OTHER PUBLICATIONS

Mohammad, Baker, Embedded Memory Design for Multi-Core and Systems on Chip. Springer (2014).

(Continued)

*Primary Examiner* — Tuan V Thai
(74) *Attorney, Agent, or Firm* — Young Basile Hanlon & MacFarlane, P.C.

(57) ABSTRACT

Managing a cache includes parsing a physical address of a data block to determine a partition identifier (ID) and a tag; the partition ID compared against a partition table storing partition IDs. The partition table indicates at least one way partition and at least one set partition corresponding to the partition ID. Based on the partition table, a way partition is determined at which to store the data block, corresponding to a subset of columns of a cache and, based on the partition table and the tag, a set partition is determined at which to store the data block, corresponding to a subset of rows of the cache. A cache address is generated for the data block within a first region of the cache corresponding to an intersection of the way partition and the set partition. The data block is stored to the cache according to the cache address.

20 Claims, 14 Drawing Sheets

(56) References Cited

U.S. PATENT DOCUMENTS

| | | | |
|---|---|---|---|
| 7,562,205 | B1 | 7/2009 | Case et al. |
| 8,347,034 | B1 | 1/2013 | Chen et al. |
| 8,745,618 | B2 | 6/2014 | Lin et al. |
| 8,943,273 | B1 | 1/2015 | Jamil et al. |
| 9,015,351 | B1 | 4/2015 | Geddes et al. |
| 9,379,992 | B2 | 6/2016 | Snyder, II et al. |
| 9,529,532 | B2 | 12/2016 | Kessler et al. |
| 10,282,299 | B2 | 5/2019 | Mukherjee et al. |
| 10,698,916 | B1 * | 6/2020 | Levy ................ G06T 1/60 |
| 11,010,165 | B2 | 5/2021 | Snyder, II et al. |
| 2003/0065874 | A1 | 4/2003 | Marron et al. |
| 2004/0117558 | A1 | 6/2004 | Krick et al. |
| 2004/0165609 | A1 | 8/2004 | Herbst et al. |
| 2008/0130655 | A1 | 6/2008 | Herbst et al. |
| 2010/0169582 | A1 | 7/2010 | Hinton et al. |
| 2011/0010503 | A1 | 1/2011 | Yamamura et al. |
| 2011/0093687 | A1 | 4/2011 | Chen et al. |
| 2012/0173819 | A1 | 7/2012 | Solihin |
| 2014/0032829 | A1 | 1/2014 | Solihin |
| 2014/0032854 | A1 | 1/2014 | Lih et al. |
| 2014/0040676 | A1 | 2/2014 | Solihin |
| 2014/0173379 | A1 | 6/2014 | Loh et al. |
| 2015/0032962 | A1 | 1/2015 | Buyuktosunoglu et al. |
| 2015/0067264 | A1 | 3/2015 | Eckert et al. |
| 2015/0186292 | A1 | 7/2015 | Sundaram et al. |
| 2015/0193353 | A1 | 7/2015 | Habermann |
| 2016/0019158 | A1 | 1/2016 | Palacharla et al. |
| 2016/0054922 | A1 | 2/2016 | Awasthi et al. |
| 2016/0321176 | A1 | 11/2016 | Too et al. |
| 2016/0335190 | A1 | 11/2016 | Li et al. |
| 2016/0350229 | A1 | 12/2016 | Reed |
| 2017/0109388 | A1 * | 4/2017 | Brewster ............ G06F 16/248 |
| 2018/0121354 | A1 | 5/2018 | Ishyama |
| 2018/0373635 | A1 | 12/2018 | Mukherjee et al. |
| 2020/0293318 | A1 | 9/2020 | Snyder, II et al. |
| 2020/0310804 | A1 * | 10/2020 | Hughes ............... G06F 9/3455 |

OTHER PUBLICATIONS

Non-Final Office Action in U.S. Appl. No. 17/305,487, dated Sep. 13, 2022.

* cited by examiner

CACHE DIRECTORY

| CACHE BLOCK | POSESSION | TYPE | IMLC |
|---|---|---|---|
| X | C0, C1 | INSTR | 1 |
| Y | C1 | DATA | 0 |
| Z | C7 | INSTR | 0 |

PARTITION TABLE

| PARTITION/ SOURCE | WAYS | SETS |
|---|---|---|
| P0 | W1, W2 | S2 |
| P1 | W3 | S1, S2, S3 |
| P2 | W0, W1 | S0, S1 |

SHARED MID-LEVEL DATA CACHE

CROSS-REFERENCE TO RELATED APPLICATION(S)

This application is a continuation-in-part of U.S. application patent Ser. No. 16/425,435, filed May 29, 2019, and claims priority to and the benefit of U.S. Provisional Application Ser. No. 62/944,269, filed Dec. 5, 2019, each of which is incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application-aware systems operate to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPsec), Anti-Virus (AV) and Anti-Spam functionality at wire-speed. IPsec, in particular, is a framework of standards for providing secure communications over IP networks through the use of cryptographic security services. IPsec supports network-level peer authentication, data integrity, authentication of data origin, data encryption, and replay protection.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

Modern processors have caches to accelerate performance. A processor cache typically holds most recently accessed data. Caches speed up processor accesses to memory. Unfortunately, larger caches can cause higher latency when accessed. Thus, modern processors have a cache hierarchy, implementing Level 1 (L1) caches that are relatively small, fast, and located closest to the processor(s), along with lower-level caches that are larger and located further from the processor(s).

SUMMARY

In one aspect, in general, a circuit comprises: a cache having a plurality of sets and a plurality of ways; a storage unit storing a partition table storing a plurality of partition identifiers (IDs), wherein a first partition ID is associated a first entity accessing the cache, and a second partition ID is associated with a second entity accessing the cache; and a controller configured to: parse a physical address of a data block to determine a partition ID and a tag; compare the determined partition ID against the partition table indicating at least one way partition and at least one set partition corresponding to the determined partition ID; determine, based on the partition table, a way partition at which to store the data block, the way partition corresponding to a subset of columns of the cache; determine, based on the partition table and the tag, a set partition at which to store the data block, the set partition corresponding to a subset of rows of the cache; generate a cache address for the data block, the cache address being within a first region of the cache corresponding to an intersection of the determined way partition and the determined set partition; and store the data block to the cache according to the cache address.

Aspects can include one or more of the following features.

The controller is configured to store a particular data block in the first region of the cache after determining whether there are any copies of the particular data block in any of a plurality of other regions of the cache different from the first region of the cache.

The other regions of the cache correspond to different subsets of rows of the cache other than rows of the set partition corresponding to the first region of the cache.

The controller is configured to remove any copies of the particular data block found in any of the plurality of other regions of the cache before storing the particular data block in the first region of the cache.

The controller is configured to receive an invalidation command that indicates that at least a first data block stored within the first region of the cache is no longer valid.

The invalidation command indicates that all data blocks stored within the first region of the cache are no longer valid.

The controller is configured to invalidate all data blocks stored within the first region of the cache in response to the invalidation command by sequentially marking as invalid any cache entries for storing data blocks in the first region of the cache that are not already marked as invalid.

The invalidation command is sent to the controller from a pipeline of a processor that executes the first entity and the second entity as software processes.

The first entity comprises a software process executing at a first privilege level, and the second entity comprises a software process executing at a second privilege level lower than the first privilege level.

The invalidation command is sent to the controller by the first software process after executing code of a system call initiated by the second software process and before passing a result of the system call to the second software process.

The code of the system call includes a memory access that accesses a data block having a cache address within the first region of the cache.

In another aspect, in general, a method for managing a cache having a plurality of sets and a plurality of ways comprises: parsing a physical address of a data block to determine a partition identifier (ID) and a tag; comparing the determined partition ID against a partition table storing a plurality of partition IDs, wherein a first partition ID is associated a first entity accessing the cache, and a second partition ID is associated with a second entity accessing the cache, the partition table indicating at least one way partition and at least one set partition corresponding to the determined partition ID; determining, based on the partition table, a way partition at which to store the data block, the way partition corresponding to a subset of columns of a cache; determining, based on the partition table and the tag, a set partition at which to store the data block, the set partition corresponding to a subset of rows of the cache; generating a cache address for the data block, the cache address being within a first region of the cache corresponding to an intersection of the way partition and the determined set partition; and storing the data block to the cache according to the cache address.

Aspects can include one or more of the following features.

The method further comprises storing a particular data block in the first region of the cache after determining whether there are any copies of the particular data block in any of a plurality of other regions of the cache different from the first region of the cache.

The method further comprises receiving an invalidation command that indicates that at least a first data block stored within the first region of the cache is no longer valid.

The invalidation command indicates that all data blocks stored within the first region of the cache are no longer valid.

The method further comprises invalidating all data blocks stored within the first region of the cache in response to the invalidation command by sequentially marking as invalid any cache entries for storing data blocks in the first region of the cache that are not already marked as invalid.

The invalidation command is sent to the controller from a pipeline of a processor that executes the first entity and the second entity as software processes.

The first entity comprises a software process executing at a first privilege level, and the second entity comprises a software process executing at a second privilege level lower than the first privilege level.

The invalidation command is sent to the controller by the first software process after executing code of a system call initiated by the second software process and before passing a result of the system call to the second software process.

The code of the system call includes a memory access that accesses a data block having a cache address within the first region of the cache.

Aspects can have one or more of the following advantages.

In some cases, side effects of incorrect instructions that were speculatively executed may persist long enough to make higher-privileged software executing on the processor vulnerable to attacks by lower-privileged software. For example, some such vulnerabilities are described in "Spectre Attacks: Exploiting Speculative Execution" arXiv: 1801.01203 [cs.CR], and "Meltdown" arXiv:1801.01207 [cs.CR], each of which is incorporated herein by reference. A privilege level can be determined based on one or more of an exception level, and/or a security level, for example, and is part of, and/or determined by an instruction's context. The privilege level generally determines the access rights associated with a particular context. The context associated with an instruction can include information about a privilege level, and information about other characteristics, including for example, the instruction's virtual address being within a particular virtual address space, or the instruction being associated with a particular virtual machine, or other attributes that define an environment in which an instruction having that context is executed. Instructions associated with different contexts are generally intended to execute in isolation. Security concerns arise from the unintended ability to transfer information between contexts. One of the features of some processors that allows a program executing lower-privileged instructions to attack a program executing higher-privileged instructions is the manner in which shared structures are managed.

The techniques described herein are able to mitigate certain potential vulnerabilities for certain microprocessor architectures, while still maintaining performance. In particular, the techniques are able isolate a portion of a cache associated with a higher-privileged entity (e.g., a kernel process) from a lower-privileged entity (e.g., a user process), which is useful for improved security. For example, without such isolation, a lower-privileged entity can "warm up" a branch predictor by executing carefully crafted code. After the higher-privileged entity executes out of the same branch predictor state and updates the cache, the lower-privileged entity can determine information that it is not authorized to obtain by timing the accesses to the cache, as described in more detail below. While some techniques for clearing state of a cache (e.g., flushing the entire cache, or a software solution that prevents speculation) could also be used to mitigate some of these vulnerabilities, such techniques do not necessarily maintain security and performance at the same time.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 is a table illustrating a cache directory in one embodiment.

DETAILED DESCRIPTION

A description of example embodiments follows.

Figure 1:
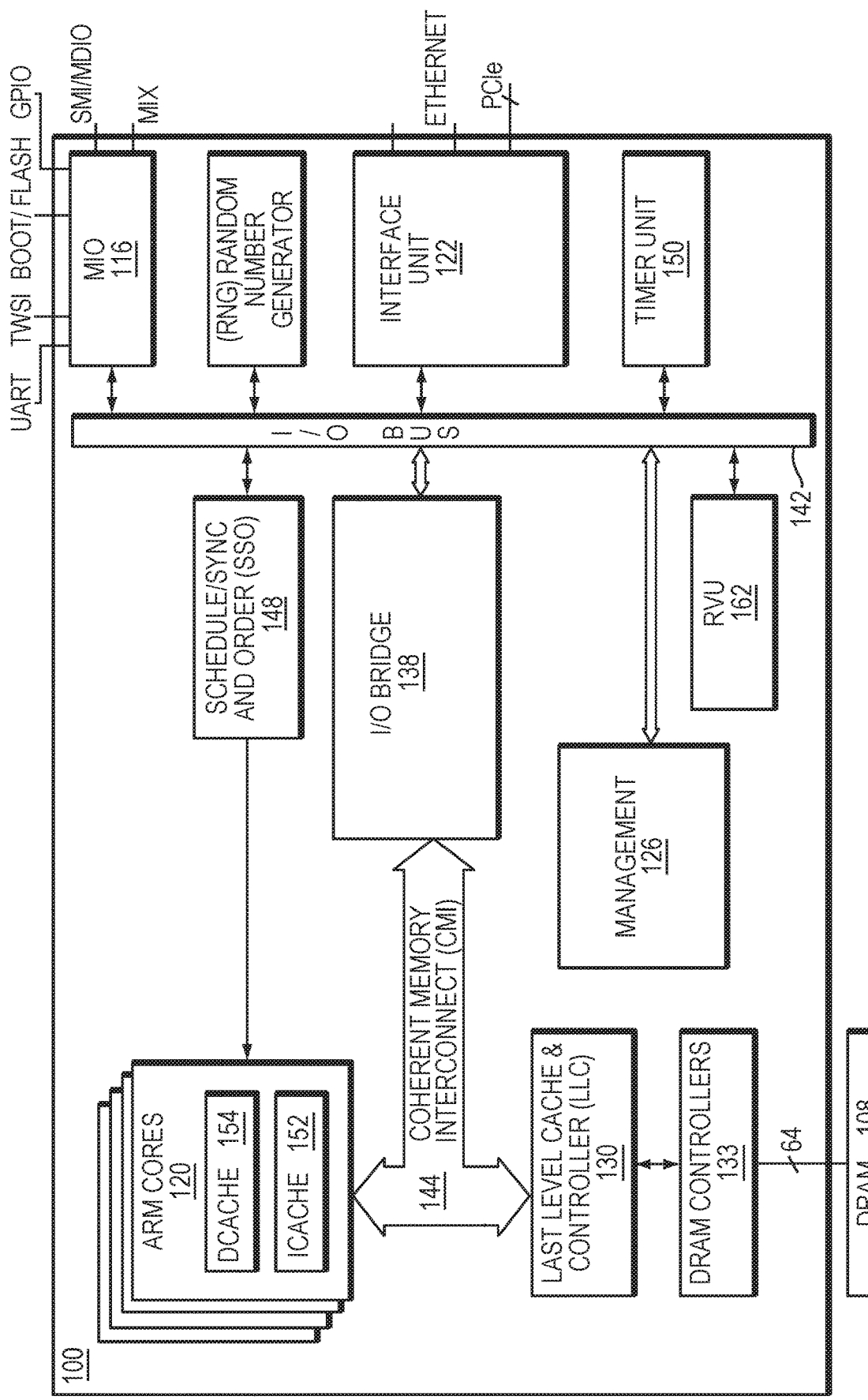
FIG. 1 is a block diagram illustrating a network services processor in which embodiments of the present invention may be implemented.

FIG. 1 is a block diagram illustrating a network services processor 100. The network services processor 100 may process Open System Interconnection network L2-L7 layer protocols encapsulated in received packets. As is wellknown to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by an interface unit 122. The interface unit 122 performs pre-processing of the received packet by checking various fields in the network protocol headers (e.g., L2, L3 and L4 headers) included in the received packet, and may perform checksum checks for TCP/User Datagram Protocol (UDP) (L3 network protocols). The interface unit 122 may receive packets via multiple network interface protocols, such as Ethernet and Peripheral Component Interconnect Express (PCIe). In a further embodiment, the interface unit 122 may be configured to receive packets from a plurality of X Attachment Unit Interfaces (XAUI), Reduced X Attachment Unit Interfaces (RXAUI), Serial Gigabit Media Independent Interfaces (SGMII), 40GBASE-R, 50GBASE-R, and/or 100GBASE-R. The interface unit 122 may also prepare and transmit outgoing packets via one or more of the aforementioned interfaces.

The interface unit 122 may then writes packet data into buffers in the last level cache and controller (LLC) 130 or external DRAM 108. The packet data may be written into the buffers in a format convenient to higher-layer software executed in at least one of the ARM processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing.

An I/O bridge 138 is configured to manage the overall protocol and arbitration and provide coherent I/O portioning with an I/O Bus 142. The I/O bridge 138 may include buffer queues for storing information to be transferred between a coherent memory interconnect (CMI) 144, the I/O bus 142, and the interface unit 122. The I/O bridge 138 may comprise a plurality of individual bridges on which communications and arbitration can be distributed.

The miscellaneous I/O interface (MIO) 116 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two wire serial interface (TWSI), and other serial interfaces.

A Schedule/Sync and Order (SSO) module 148 queues and schedules work for the processor cores 120. Work is queued by adding a work queue entry to a queue. For example, a work queue entry is added by the interface unit 122 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154. In one embodiment, the network services processor 100 includes 24 ARM processor cores 120. In some embodiments, each of the ARM processor cores 120 may be an implementation of the ARMv8.2 64-bit architecture, and may be compatible with the ARMv8.2 software ecosystem and include hardware floating point, SIMD, and MMU support. In such an embodiment, consistent with the ARMv8.2 architecture, the cores 120 may contain full hardware support for virtualization. Guest operating systems can thus run at ARM defined user and operating system privilege levels, and hypervisor software can run in a separate higher privilege level. The cores 120 may also supports a secure state in which software may run in three different privilege levels while hardware provides isolation from the nonsecure state.

Last level cache and controller (LLC) 130 and external DRAM 108 are shared by all of the processor cores 120 and I/O co-processor devices. Each processor core 120 is coupled to the LLC 130 by the CMI 144. The CMI 144 is a communication channel for all memory and I/O transactions between the processor cores 120, the I/O bridge 138 and the LLC 130. In one embodiment, the CMI 144 is scalable to multiple (e.g., 24) processor cores 120, supporting fully-coherent Level-1 data caches 154 with write through. The CMI 144 may be highly-buffered with the ability to prioritize I/O.

The controller of the LLC 130 maintains memory reference coherence. It returns the latest copy of a block for every fill request, whether the block is stored in LLC 130, in external DRAM 108, or is "in-flight." A plurality of DRAM controllers 133 supports the external DRAM 108, and can support preferred protocols, such as the DDR4 protocol.

After a packet has been processed by the processor cores 120, the interface unit 122 reads the packet data from the LLC 130, DRAM 108, performs L4 network protocol post-processing (e.g., generates a TCP/UDP checksum), forwards the packet through the interface unit 122 and frees the LLC 130/DRAM 108 used by the packet. The DRAM Controllers 133 manage in-flight transactions (loads/stores) to/from the DRAM 108.

A resource virtualization unit (RVU) 162 may enable software to map various local function (LF) resources in various modules into several physical functions (PFs) and virtual functions (VFs). This enables multi-unit software drivers compatible with Linux, Windows and DPDK.

A management module 126 may include various units for managing operation of the network services processor 100. For example, the management module 126 may include a temperature sensor, a power serial bus master interface to determine current performance and energy consumption, and a memory diagnostic controller to detect and report memory errors. The module 126 may further include control processors, such as a system control processor for power management and other secure chip management tasks, and a module control processor for module management and other nonsecure chip management tasks.

Figure 2:
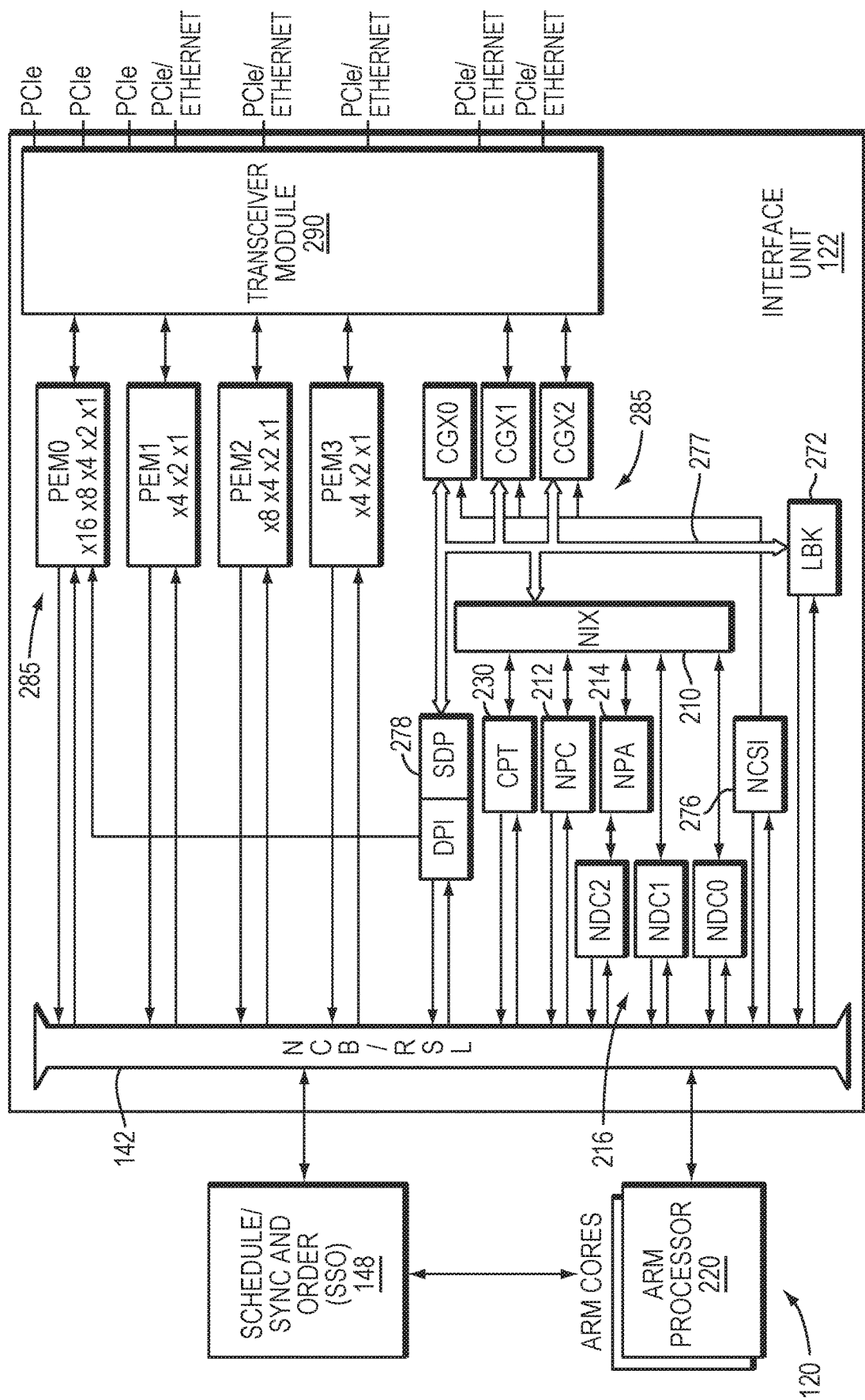
FIG. 2 is a block diagram of a networking and input/output portion of the network services processor of FIG. 1.

FIG. 2 is a block diagram of the interface unit 122 in further detail. Transceiver module 290 transmits and receives signals in accordance with one or more communications protocols, such as PCIe, Ethernet. Interface modules 285, including PCI Express interface units (PEM0-PEM3), and Ethernet I/O controllers (CGX0-CGX2) process received and outgoing signals in accordance with their respective protocols. A network controller sideband interface (NCSI) unit 276 provides an interface and protocol controller for a NCSI bus 277, which provides network packet data from/to the CGX interface modules 285.

A network interface unit (NIX) 210 provides a controller and direct memory access (DMA) engines to process and move network packets. The NIX 210 transmits and receives packets to and from the aforementioned interfaces 285, and communicates with the SSO module 148 to schedule work for the cores 120 to further process the packets. The NIX may also communicate with the cores 120 to forward work in lieu of the SSO 148, and can receive packets from the cores 120 for transmission. The cores 120, shown in FIG. 1, may include processors such as an ARM processor 220 as shown in FIG. 2. The NIX may include a transmit subunit (NIX-TX) and a receive subunit (NIX-RX), and a loopback module (LBK) 272 enables packets transmitted by NIX-TX to be looped back and received by NIX-RX.

The NIX 210 operates with a number of coprocessors. In particular, a network parser CAM unit (NPC) 212 parses network packets received for or transmitted from the NIX. A network pool allocator unit (NPA) 214 may allocate and free pointers for packet, work-queue entry, send descriptor buffers, and may support integration with a virtualization scheme. The SSO 148, as described above, schedules work-queue entries for NIX packets. A cryptographic accelerator unit (CPT) 230 optionally decrypts Internet Protocol Security (IPsec) packets received by the NIX 210 and can encrypt data for outgoing packets. A data cache (NDC0-NDC1) 216 is a common data cache block for use by the NIX 210 and NPA 214.

Previous embodiments, disclosed in U.S. Pat. No. 9,379,992 (the entirety of which is incorporated herein by reference), provide a network buffer allocator to support virtual machines. In such embodiments, buffer pointers are requested to be allocated by software (e.g., a core) or hardware (e.g., a network adapter). This agent requested a buffer pointer allocation by providing an "aura," which is a number under a given virtual function (VF). The aura and VF is then mapped to a pool, and from that pool, a corresponding stack is popped, returning the free buffer address. Likewise, software or hardware could free buffers by providing an aura, VF and buffer address, which was mapped to a pool and, in turn, a stack to be pushed with the buffer address.

Such embodiments, as implemented, may utilize hardware structures of a certain size, (e.g., 4K auras and 256 pools). These hardware structures may present certain drawbacks. First, such a hardware limit can restrictive to software. For example, a large number of queues may be needed in a system supporting remote direct memory access (RDMA), whereby pools must be assigned to one of a large number of user processes. Many RDMA drivers, for example, support 64K or 1 M processes. Implementing hardware-fixed storage for 1 M processes would be impractical. A second potential drawback is that a system may have need for many fewer auras or pools, and an embodiment implementing storage for a much larger number of auras/pools than required may be wasteful of silicon area (i.e., cost) and power.

Figure 3:
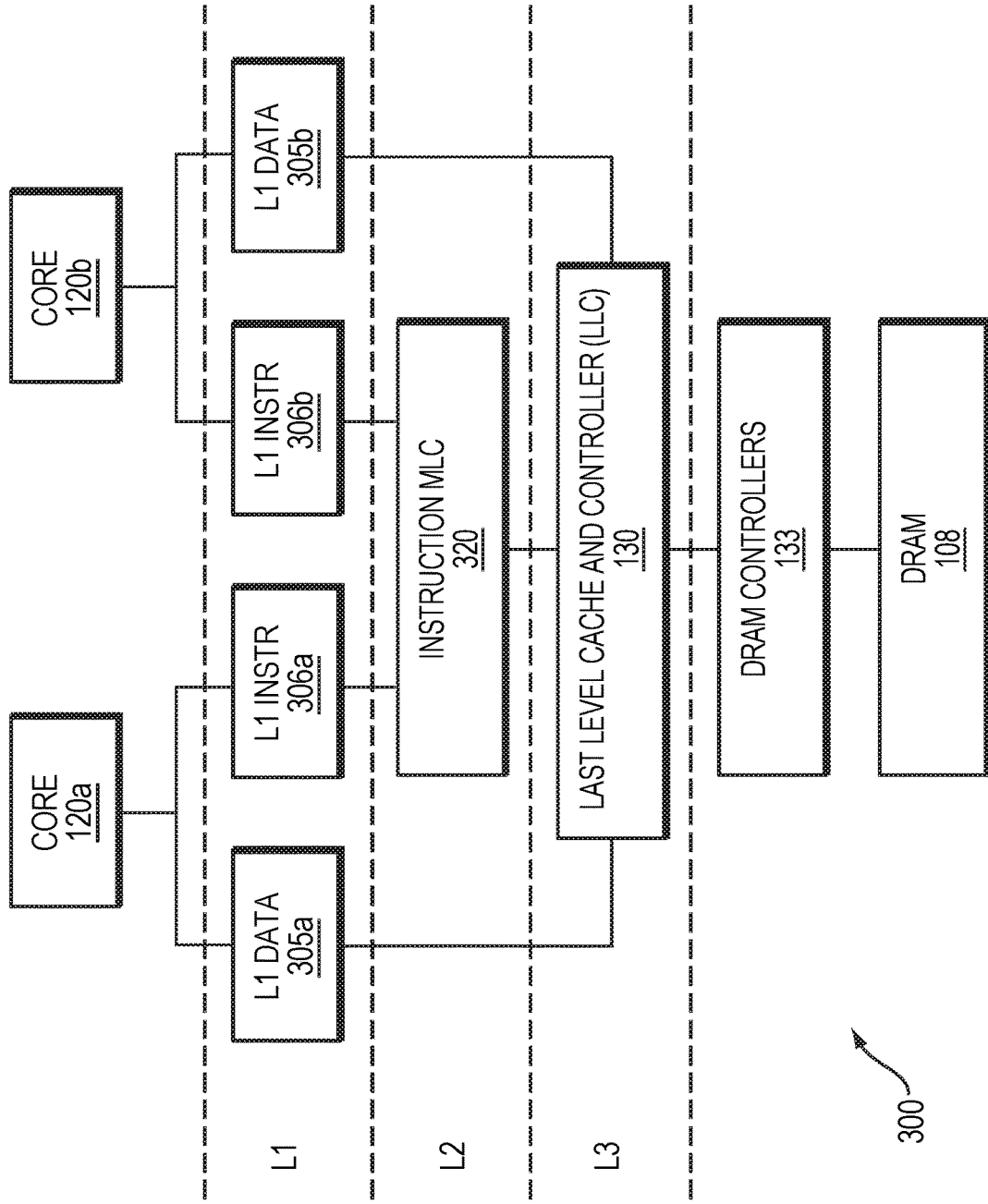
FIG. 3 is a block diagram of processor cores and memory subsystem in one embodiment.

FIG. 3 is a block diagram of a subset of the components of the network services processor 100, including processor cores 120a-b and a memory subsystem 300. The memory subsystem 300 includes a three-level hierarchy of caches (L1-L3), as well as the DRAM 133 and respective controllers 133. The first cache level, L1, includes L1 data caches 305a-b and L1 instruction caches 306a-b. Each of the L1 caches 305a-b, 306a-b may be exclusive to a respective core 120a-b, and is closest in proximity to the cores 120a-b. For example, the L1 caches 305a-b, 306a-b may occupy a common chip or a common system in package (SiP) with the respective core 120a-b. The L1 data caches 305a-b may be utilized by the respective core 120a-b to cache data, and the L1 data caches 306a-b may store instructions to be executed by the respective core 120a-b. To maintain the integrity of the instructions, the cores 120a-b may be prevented from writing to the L1 instruction caches 306a-b.

The LLC 130, residing at level 3, may be configured as a shared cache to store data and instructions for both cores 120a-b. The LLC 130 may be communicatively coupled to the L1 caches 305a-b, 306a-b either directly or via a level 2 or other intermediary cache. The LLC 130 may be considered a "last level" cache due to occupying the last level of the cache hierarchy. Accordingly, the LLC may access the DRAM 108 (via the DRAM controllers 133) to retrieve data and/or instructions upon a cache miss, and may update the DRAM 108 in accordance with data modified by the cores 120a-b.

An instruction mid-level cache (IMLC) 320 occupies level 2. The ILC 320 may be configured, as a shared cache, to provide instructions to the plurality of L1 instruction caches 306a-b. The IMLC 320 may fetch such instructions as cache blocks from the LLC 130. The cores 120a-b, following a cache "miss" at the L1 instruction caches 306a-b, may access the IMLC 320 for the requested instructions, followed by LLC 130 if a cache miss occurs at the IMLC 320. Invalidates can be forwarded from the LLC 130 to the IMLC 320 when there is a write to this cache block from the data space, thereby creating self-modifying code. However, the cores 120a-b may be prevented from directly writing to the IMLC 320 in order to protect the integrity of the instructions.

The LLC 130 may maintain a cache directory that indicates which of the cores 120a-b are in possession of each cache block stored by the memory subsystem 300. For larger subsystems servicing a large number of cores, such a directory may require a substantial number of bits per cache block. Further, for updates to the directory, the LLC may be required to forward invalidates to the caches and/or cores associated with a given cache block, where the invalidates indicate that the cache block is no longer valid. Such communications may occupy considerable bandwidth of the memory subsystem 300.

Thus, example embodiments provide for optimizing communications of a memory subsystem particularly with regard to invalidates. For example, the LLC 130 may maintain the cache directory such that instruction cache blocks are tagged (via, e.g., a single bit) to indicate whether they are cached at the IMLC 320. Alternatively, a single bit per LLC cache block may be maintained to designate if the access was an instruction access. If it is not, then it can be determined that the IMLC 320 is not storing the cache block and, thus, and invalidated does not need to be sent to the IMLC 320, nor does the IMLC 320 need to be probed for invalidation. As a result, communications traffic within the memory subsystem 300 is reduced, improving bandwidth in the memory subsystem 300.

Although the memory subsystem 300 is shown to include two cores 120a-b and associated caches, example embodiments may implement a larger number of cores. For example, the network processor 100 may implement 24 processor cores 120, which may be divided into clusters of 6 cores 120. Each cluster of 6 cores 120 may, in turn, may be configured in a common memory subsystem such as the subsystem 300, and may share common caches such as the IMLC 320 and LLC 130. In further embodiments, one or more additional caches and/or cache levels may be implemented in the memory subsystem 300. For example, an L2 data cache may be implemented as described in further detail below. Alternatively or in addition, one or more additional cache levels may be implemented above, below or in between levels L1-L3, and those levels may implement caches including one or more features of the caches of levels L1-L3.

FIG. 4 illustrates a cache directory 400 in an example embodiment. As described above, the LLC 130 or another controller may maintain the cache directory, which includes a record of cache blocks and their possession within the memory subsystem 300. Entries of the leftmost column of the cache directory 400 include identifiers identifying the given cache block, and entries of the adjacent column indicate which of the processor cores (e.g., cores 120a-b) are in possession of the cache block. A further column may include a tag indicating whether the cache block is a cached instruction or data, and this indication may be expressed by a single bit. Lastly, the rightmost column indicates whether the cache block is an instruction block that is stored at the IMLC 320. Entries in this column may be a single bit, where 1 indicates that the cache block is stored at the IMLC 320, and 0 indicates that it is not.

Figure 5:
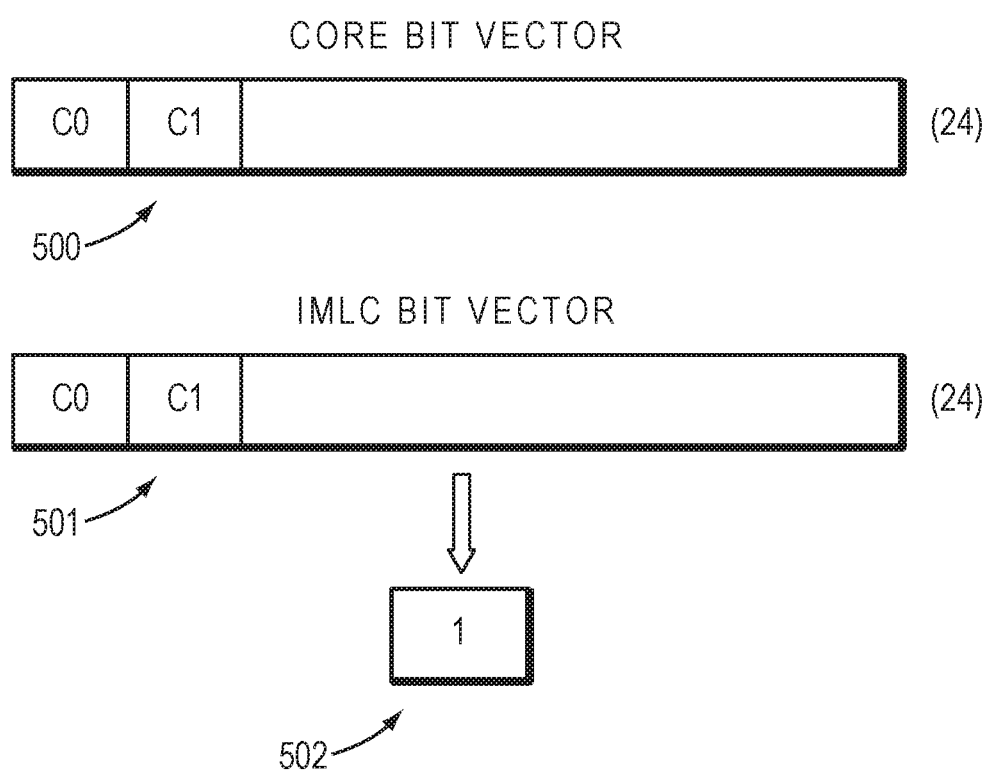
FIG. 5 are tables illustrating bit vectors in one embodiment.

FIG. 5 illustrates bit vectors that may be implemented in the cache directory 400. A core bit vector 500 may have a number of bits equal to the number of processor cores (e.g., 24) connected to the memory subsystem 300, where each bit of the bit vector 500 identifies whether a given one of the processor cores is in possession of a given cache block. For example, the bit vector 500, as shown, may include two bits indicating that cores C0 and C1 are in possession of cache block X as shown in the first row of the cache directory 400.

An IMLC bit vector 501 can indicate which of the processor cores is in possession of an instruction cache block that is also cached at the IMLC 330. However, because the IMLC 320 is a unified cache, for the purpose of determining whether to send invalidates, the LLC 130 can make such a determination based on whether the instruction cache block is stored at the IMLC 320. Therefore, the IMLC bit vector 501 may be reduced to a single-bit tag 502, where the tag 502 indicates whether the instruction cache block is stored at the IMLC 320. Referring again to the cache directory 400, the tag 501 may be included in the rightmost column of the directory 400.

Figure 6:
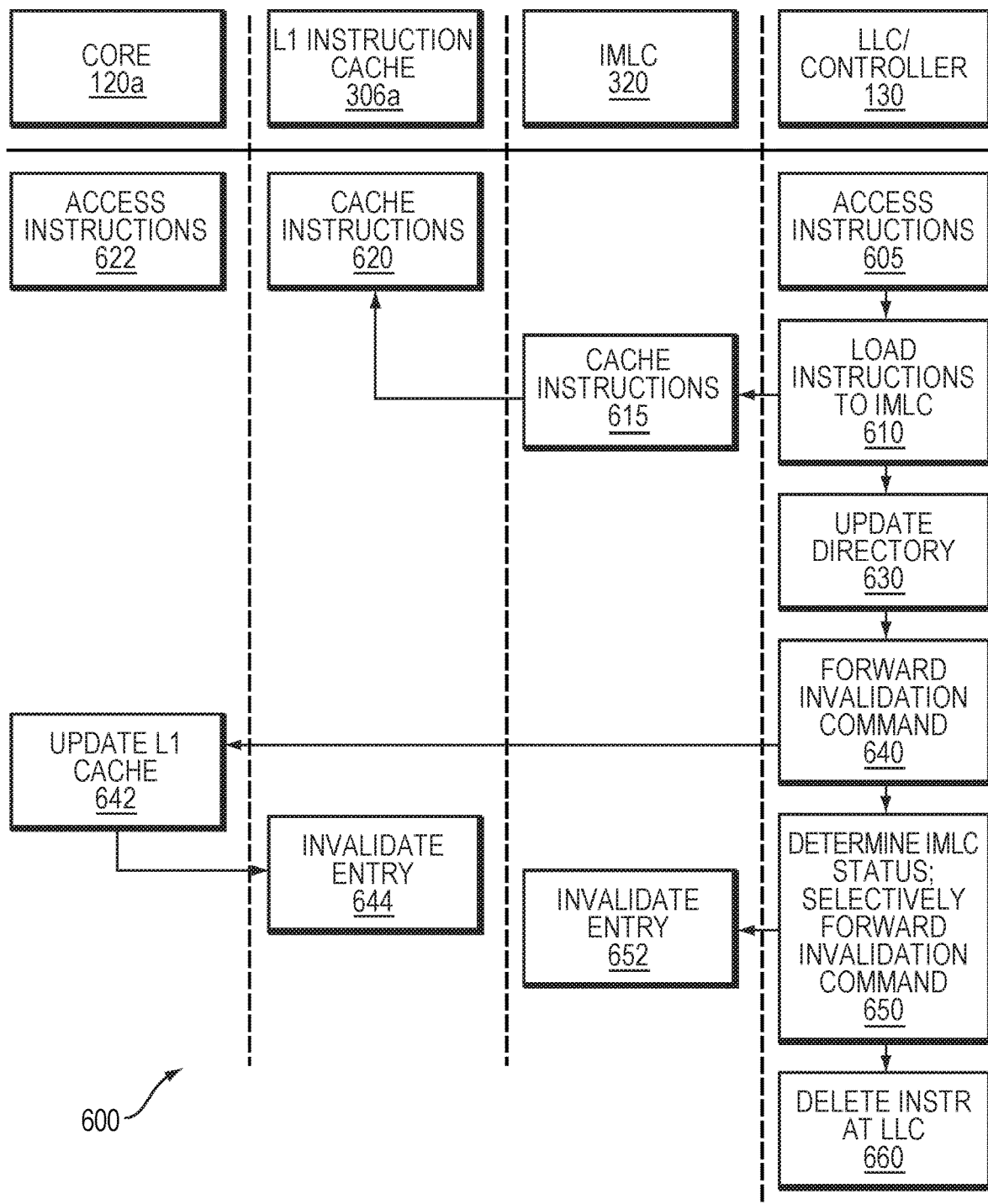
FIG. 6 is a flow diagram of a process of caching instructions in one embodiment.

FIG. 6 is a flow diagram of an example process 600 of operating a memory a memory subsystem. With reference to FIG. 3, in response to a request originated by the processor core 120a, the LLC 130 may access requested instructions as an instruction cache block from the DRAM 108 or the LLC itself (605). The LLC 130 may then load the instruction cache block to the IMLC 320, which, in turn, stores the instruction cache block (610, 615). The L1 instruction cache 306a may receive and store the cache instruction block from the ILC 320 (620), where it can be accessed by the core 120a to execute the instructions. Based on the caching of the instruction cache block at the IMLC 320 and the Il instruction cache 306a, the LLC 130 updates the cache directory 400 accordingly (630). For example, the LLC 130 may add an entry to the cache directory 400 that identifies the cache block, indicates possession by the core 120, indicates that the cache block is an instruction, and indicates that it is stored at the IMLC 320. If the instruction cache block is already indexed at the cache directory (e.g., it was previously cached for a different processor core), then the directory entry may be updated accordingly.

After the instruction cache block has been utilized by the core 120a, and upon determining that the instruction cache block is to be replaced or otherwise discarded, the LLC 130 may send invalidates to the caches/cores in possession of the instruction cache block. To do so, the LLC 130 may refer to the respective entry for the instruction cache block in the cache directory 400. In this example, upon identifying that the core 120a is in possession of the instruction cache block, the LLC 130 may forward an invalidation command to the core 120a (640). In response to the invalidation command, the core 120a may update the L1 instruction cache 306a (642), invalidating the instruction cache block at the L1 instruction cache 306a (644). The LLC 130 may also refer to the cache directory to determine whether the instruction cache block is stored at the IMLC 320 (650). For example, referring to the cache directory 400 in FIG. 4, the instruction cache block may have an entry indicating that it is stored at the ILC 320, as in the entry for cache block X. If so, then the LLC 130 may forward an invalidation command to the IMLC 320 (650), which, in turn, invalidates its cache entry corresponding to the instruction cache block (652). Alternatively, the instruction cache block may have an entry indicating that it is not stored at the IMLC 320, as in the entry for cache block Z. In such a case, the LLC 130 may refrain from sending an invalidation command to the IMLC 320, thereby conserving bandwidth within the memory subsystem 300. Once the determined invalidates have been sent, the LLC 130 may then delete the instruction cache block stored at the LLC 130, and update the cache directory 400 to remove the entry corresponding to the instruction cache block (660).

Thus, example embodiments may include a memory subsystem including a plurality of L1 instruction caches 306a-b, a mid-level instruction cache (e.g., IMLC 320), and a low-level cache and controller (LLC) (e.g., LLC 130). Each of the L1 instruction caches 306a-b may be configured to cache instructions for a respective one of a plurality of processor cores 120a-b. The mid-level instruction cache 320 may be configured to cache instructions for the processor cores 120a-b, and may provide instructions to the L1 instruction caches 306a-b. The LLC 130 may be configured to 1) provide the instructions to the mid-level instruction cache and 2) maintain a directory indicating locations at which the instructions are stored. The LLC 130 may be further configured to store an entry to the directory, wherein the entry indicates whether an instruction is stored at the mid-level instruction cache. Prior to deleting the entry, the LLC 130 may selectively send an invalidation command to the mid-level instruction cache as a function of whether the instruction is stored at the mid-level instruction cache.

The entry, as illustrated for example by the cache directory 400 of FIG. 4, may indicate one or more of the plurality of L1 instruction caches at which the instruction is stored. The entry may also include a bit vector, the bit vector including a bit indicating whether the instruction is stored at the mid-level instruction cache. The mid-level instruction cache may be configured to prevent the plurality of processors from writing to the mid-level instruction cache. The mid-level instruction cache 320, in response to receiving the invalidation command, may be further configured to invalidate a block of the mid-level instruction cache corresponding to the instruction.

The memory subsystem may also include a plurality of L1 data caches (e.g., caches 305a-b), each of the L1 data caches being configured to cache data for a respective one of the plurality of processors. The directory may further indicate locations at which the data are stored.

Figure 7:
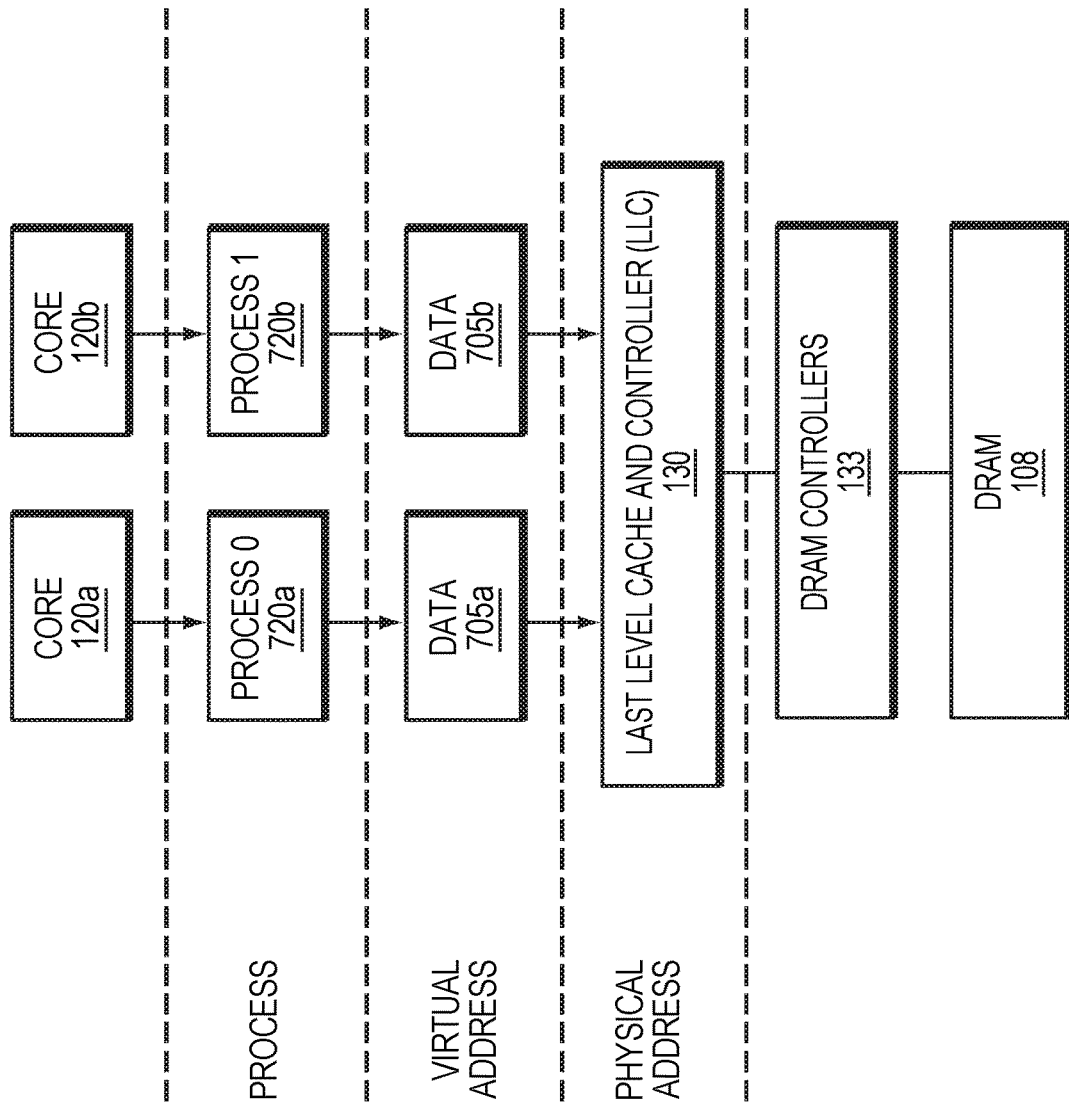
FIG. 7 is a flow diagram of processes operated by processor cores in one embodiment.

FIG. 7 is a flow diagram of processes operated by processor cores 120a-b of the network services processor 100 in one embodiment. The cores 120a, 120b may operate process P0 720a and process P1 720b, respectively, and each of the processes 720a-b may be operated in accordance with a respective set of instructions (not shown). Each of the processes 720a-b, in turn, may utilize respective data 705a-b. In order to maintain independence between distinct processes, the network services processor 100 may implement a virtualization scheme as described above. Accordingly, the processes 720a-b may access the respective data 705a-b under virtual addresses, which are translated to physical addresses to the LLC 130 (or other storage) during an access operation. Thus, the LLC 130 may cache the data 705a-b at respective blocks matching the assigned physical addresses for the data 705a-b. The LLC 130, in turn, may access the DRAM 108 (via the DRAM controllers 133) to store and/or access the data 705a-b.

For example, in a virtual memory scheme, a main memory stored in DRAM, and potentially one or more levels of the cache system, are accessed using a physical address (PA) translated from a virtual address (VA). To this end, a processor core can include a translation lookaside buffer (TLB) that stores translations, defined by VA-to-PA mappings, and a page table walker for accessing a page table if a translation is not found in the TLB. The translations stored in the TLB can include recently accessed translations, likely to be accessed translations, some other types of translations, or a combination thereof. The page table can store entries that contain all of the VA-to-PA mappings currently in use. The page table is typically stored in main memory along with physical memory pages that represent corresponding mapped virtual memory pages that have been "paged in" from secondary storage (e.g., a solid state drive or hard drive). A memory page can include a number of cache blocks. A cache block can include a number of words. A word is of a predetermined number (e.g., 2) of bytes. A byte is a group of bits (e.g., 8 bits), which can be operated on as a unit. Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance.

Figure 8:
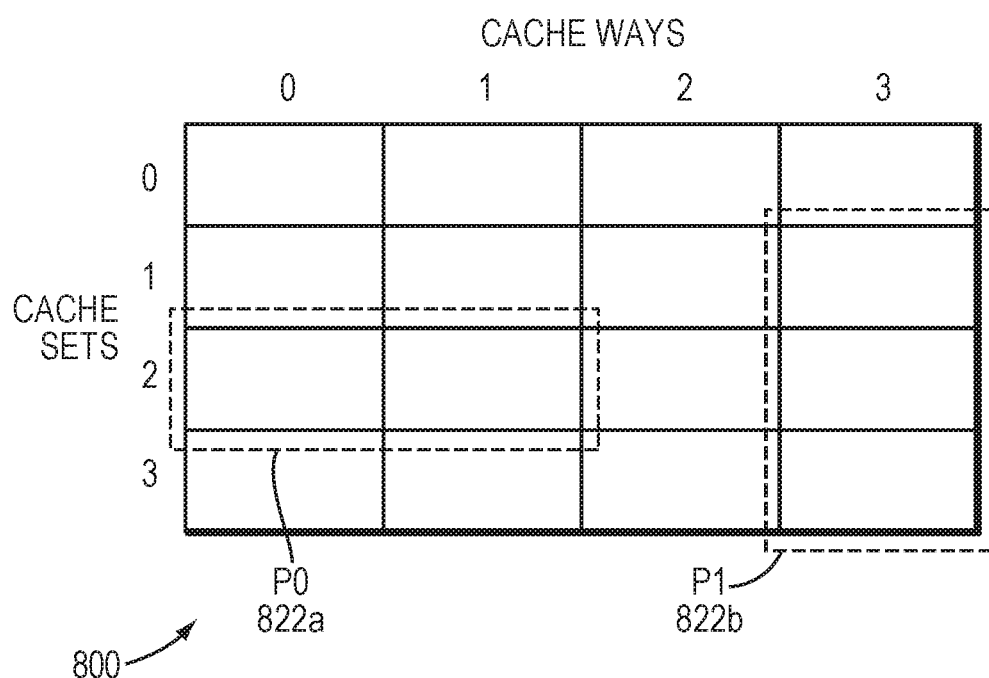
FIG. 8 is a block diagram of a divided cache in one embodiment.

FIG. 8 illustrates a cache storage array 800 in further detail. The array 800 may be implemented as the storage array of the LLC 130 or another cache such as a shared mid-level cache or an L1 cache. Here, the array 800 is shown as a plurality of cache blocks, which are organized as an N-way set associative cache into multiple rows (referred to as "sets") and N columns (referred to as "ways"). In the example shown, for illustrative purposes, the array 800 includes 4 sets (0-3) and 4 ways (0-3), but such a cache would typically have a relatively large number of sets. For an N-way set associative cache, the tag comparison can be performed N times (possibly in parallel) for the selected set (i). The comparison can be performed once for each of N ways in which a cache block containing the desired data may be stored. A block offset can then be used to select a particular word from a cache block that is found in the cache entry (i.e., a "cache hit"). If the tag does not match for any of the ways of the selected set (i.e., a "cache miss"), then the cache system can attempt to retrieve the cache block from a higher level cache or from the main memory (in the case of an LLC). The cache entry can also include bits for storing status information. The status information can include, for example, a valid bit and/or any flags or error correction bits. When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

In order to support multiple processes sharing the cache storage array 800, the cache storage array 800 may be divided into multiple subsets of various sizes, wherein each subset can be dedicated to a given software process (or simply "process"). With reference to FIG. 7, each process 720a-b may be assigned a given subset of the cache storage array 800 to store its data 705a-b, and as a result, each process 720a-b may utilize the cache storage array 800 without interfering with one another. The cache storage array 800 may be divided under a number of approaches. For example, via way partitioning, the ways of an array can be distributed among different processes. To do so, a partition identifier (ID) may be associated with every request that comes to the cache. The cache controller, in accordance with a respective replacement policy, may look up the ways assigned to that partition ID, and may select a cache block within those ways for replacement. Way partitioning can be advantageous because it may be implemented without significant changes to the cache allocation logic. Further, way partitioning may not require changes to the cache tags.

However, way partitioning may be limited when implemented in a last-level shared cache (e.g., the LLC 130) because such a cache typically has only a relatively small number (e.g., 10 to 16) of ways. A hard partitioning of the ways could result in high conflict misses. Alternatively, the ways allocated to different partition IDs can overlap, but such an approach would involve sharing of ways between partition IDs, which reduces the efficiency of partitioning.

Another method to partition a cache is set partitioning, whereby the sets of an array are distributed among different processes. Under set partitioning, a number of bits of a physical address may be used to select the set (i.e., index) into the cache.

Example embodiments provide for partitioning a cache into partitions that may be subsets of both ways and partitions. As shown in FIG. 8, the cache storage array 800 includes two partitions, where a first partition 822a is assigned to process P0 720a, and a second partition 822b is assigned to process P1 720b (FIG. 7). In this example, process P0 720a requires a limited number of cache blocks that is less than the storage available in an entire set or way. Accordingly, the first partition 822a is configured at the intersection of set 2 and ways 0,1, thereby occupying an appropriate number of cache blocks for process P0 720a. Likewise, process P1 720b also requires a limited number of cache blocks, which can be accommodated without dedicating an entire set or way to the process. Accordingly, the second partition 822b is configured to occupy the intersection of sets 1-3 and way 3. Thus, by partitioning the cache storage array 800 into subsets of ways and sets, fine-grained slices of the cache can be assigned to different processes to accurately and efficiently accommodate the cache requirements of each process, while maximizing the utility of available blocks within the cache.

Figure 9:
FIG. 9 illustrates a partition table in one embodiment.

FIG. 9 illustrates a partition table 900. The partition table 900 may be maintained by the LLC 130 or another controller, and can be referenced to determine an address at which to store and/or access a cache block at the LLC 130 or another cache. Entries of the left column include a partition ID identifying a given partition (e.g., P0-P2 as shown), each of which can be associated with one or more processes. Alternatively, or in addition, the table 900 may include entries identifying a given process and/or source originating an access request. Entries of the middle column indicate corresponding ways allocated to the partition, and entries of the right column indicate corresponding sets allocated to the partition. The partition allocated for each partition ID may be a region of the cache that is made up of the cache blocks that coincide with both the way(s) and set(s) allocated for each process (i.e., the intersection of the designated ways and sets), which can generally be referred to as a "way/set partition." The term "partition" will generally refer to a way/set partition unless it is referred to as a "way partition" or "set partition" either explicitly or implicitly based on its contextual interpretation. A way/set partition can, in some embodiments, correspond to a region made up of contiguous cache blocks, when the multiple ways and/or multiple sets that for the region are contiguous, which may be simpler to manage. But, in other embodiments, a way/set partition can correspond to a region made up of non-contiguous cache blocks. The techniques described herein allow for a given physical address to end up in multiple way/set partitions. So, for a shared data structure that is accessed by two different processes, memory addresses that store portions of that data structure may be cached in two different way/set partitions whose partition IDs are assigned to the respective processes sharing the data structure, as described in more detail below.

The partition table 900 may be generated based on 1) information on predetermined configuration of partitions (e.g., predetermined assignment of partitions to ways and/or sets), 2) information determined from access requests as received by the LLC 130 (e.g., a partition ID of a request or a tag of a physical address), or a combination thereof. For example, the partition table 900 may be initially populated with partition IDs and corresponding ways based on a predetermined configuration. Then, during operation of the LLC 130, the right column of the partition table 900 may be populated based on a tag or other bits of a physical address of an access request. An example of such a population operation is described in further detail below with reference to FIGS. 10-11. Further, the partition table may be updated over time in accordance with changes to a partition configuration.

Figure 10:
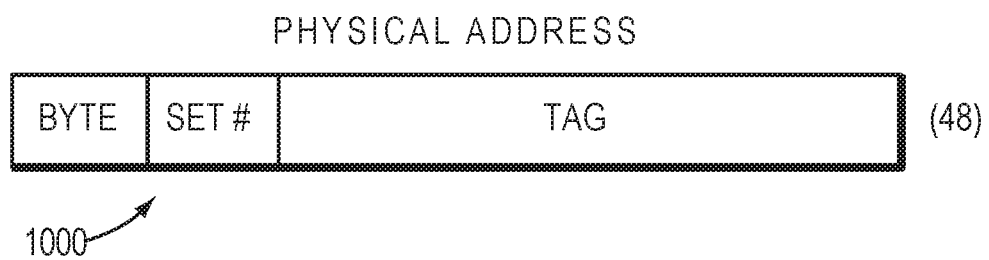
FIG. 10 is a table illustrating a physical address in one embodiment.

FIG. 10 is a table illustrating a physical address 1000 of a data block (e.g., an address of a data block corresponding to a 1-byte sized word) that may be stored to a cache in an example embodiment. In an example of set partitioning, a number of bits of the physical address 1000 may be used to select the set (i.e., index) into the cache. For a 1024-set, 8-way cache with 128-byte block sizes, a 48-bit physical address may be divided as follows:

a) Bits 0-6: Byte within the cache block of the addressed data block
b) Bits 7-16: Set number
c) Bits 17-47: Tag In an example embodiment, a cache may be divided into a number of set partitions corresponding to a power of two, where each set partition includes one or more sets. For example, as illustrated in FIG. 8, the cache storage array 800 may be divided into four set partitions as shown. To indicate the a specific one of the four set partitions, two bits of the physical address 1000 may be used to identify the set partition. For example, bits 15 and 16 may be used to identify the set partition. Thus, the physical address 1000 may be organized as follows:

a) Bits 0-6: Byte within the cache block of the addressed data block
b) Bits 7-14: Set number within a set partition
c) Bits 15-16: Used to identify the set partition
d) Bits 17-47: Tag The partition number may be determined from the partition table 900 or provided with the access request for the cache. In further embodiments, the cache may be divided into a larger number of set partitions than the 4 set partitions created by using two bits of the address. For example, the cache may be divided into 8 set partitions, and the address may include three bits that are used to determine the set partition at which the data may be stored. By combining this set partitioning with way partitioning as described above, the cache can be divided into way/set partitions that occupy less than an entire set or way, enabling multiple processes to be assigned respective cache blocks in a compact and efficient manner.

Figure 11:
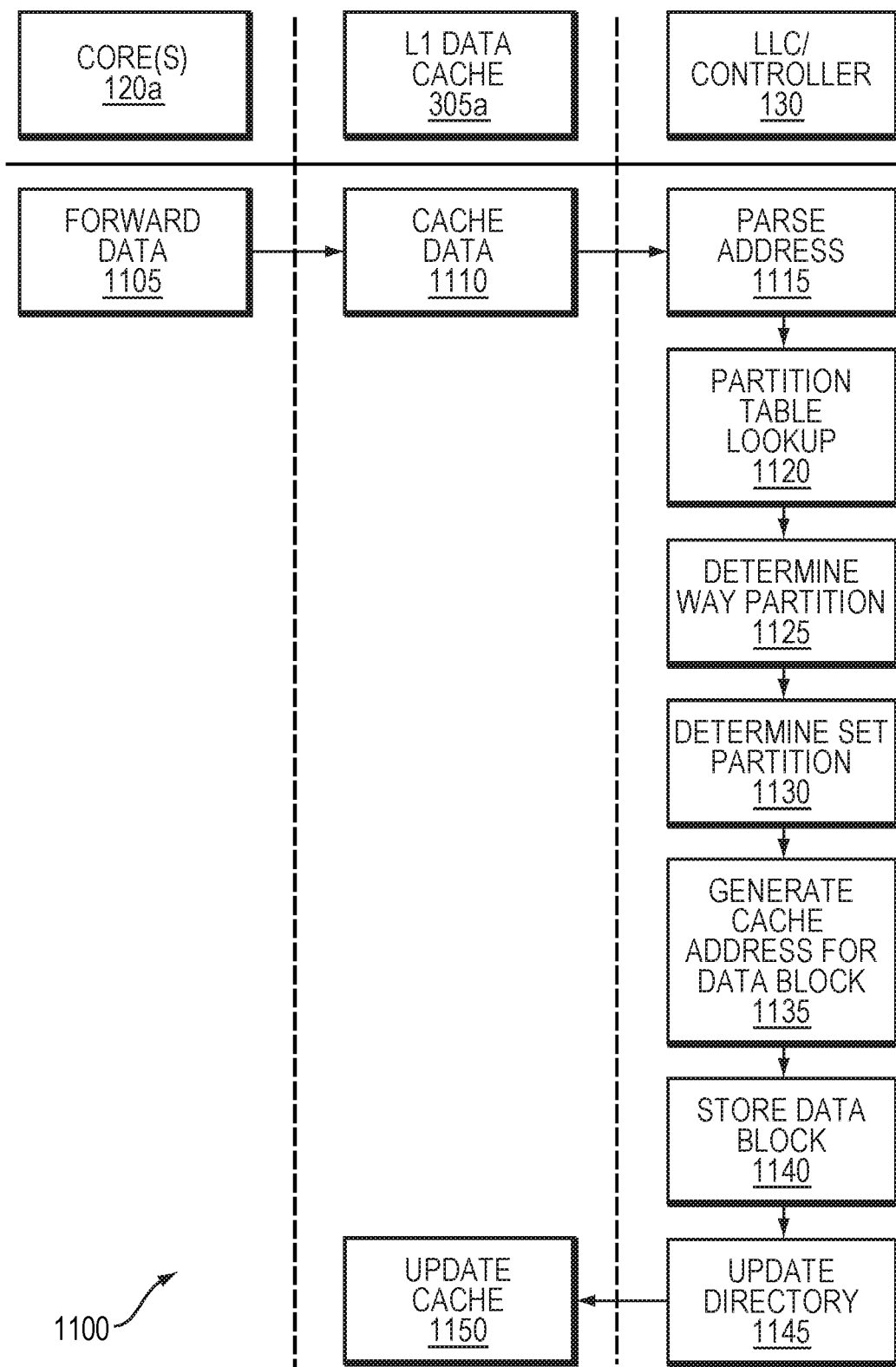
FIG. 11 is a flow diagram of a process of operating a cache in one embodiment.

FIG. 11 is a flow diagram of a process 900 of operating a partitioned cache in an example embodiment. With reference to FIG. 7, a processor core 120a may forward data to be cached at the respective L1 data cache 305a (1105), and the L1 data cache 305a may store the data (1110). If it is determined that the data is to be stored at the LLC 130, then the data is forwarded to the LLC 130 with an access request. Upon receiving the request, the LLC 130 may parse the address of the data block to determine a partition ID for the data block and a tag (1115). The partition ID may correspond to a source of the data block, the source indicating the core 120a originating the request and/or an entity (e.g., a process, thread, or other entity, also called an "encapsulation") associated with the data. For example, the partition ID may be determined based on the source of the request, even if that source is a sub-entity of another entity, such as a related program (e.g., a Javascript program) executing within a kernel process. If the encapsulation is a process, the partition ID can be assigned to the process (along with an address space ID and context identifier) when that process is allocated by the operating system (OS) or hypervisor running on a core, for example. Alternatively, the LLC 130 may parse the request to determine a source of the request, and the source may be used in place of or in addition to the partition ID in the operations below.

The LLC 130 may then perform a lookup of the partition table 900 (1120). In doing so, the LLC 130 may apply the partition ID against the partition table 900 to determine, based on the partition table 900, a way partition at which to store the data (1125). The LLC 130 may then determine a set partition for the data (1130). The LLC 130 may determine the set partition in a number of ways. For example, the LLC 130 may use bits of the physical address (e.g., bits 15-16 of the physical address 1000 as described above) to determine the set partition, and may update the partition table 900 accordingly to indicate this set partition. Alternatively, if the partition table 900 already indicates a set partition for the partition ID, then the set partition may be determined based on the partition ID. In such a case, the tag may also be used to determine the set partition. For example, if the partition table 900 indicates multiple set partitions for the partition ID, then the physical address may be used to determine one of the set partitions at which to store the data.

Once the way partition and set partition are determined, the LLC 130 may generate a cache address for the data block (1135). The cache address may be within a region of the cache that corresponds to an intersection of the way partition and the set partition. The LLC 130 may then store the data at the cache address (1140), and may update a cache directory (e.g., cache directory 400) to describe the data as a cache block within the cache (1145). Optionally, the LLC 130 may update the L1 cache 305*a* accordingly, for example by reporting the cache address to the L1 cache 305*a*, or updating the stored data in response to any alteration of the data (1150).

Thus, example embodiments may include a method of operating a cache such as the LLC 130. A physical address of a data block may be parsed to determine a partition ID and a tag. The partition ID may be compared against a partition table (e.g., partition table 900), which may indicate at least one way partition and, optionally, at least one set partition corresponding to the partition ID. Based on the partition table, a way partition at which to store the data block may be determined, where the way partition corresponds to a subset of columns of the cache. Based on the partition table and the physical address, a set partition at which to store the data block may be determined, wherein the set partition corresponds to a subset of rows of the cache. A cache address may then be generated for the cache block, the cache address being within a region of the cache corresponding to an intersection of the way partition and the set partition. The data block may then be stored to the cache according to the cache address.

The cache, as described above, may be a shared cache that is accessed by a plurality of sources, each of which may include a respective processor, such as the processors 120*a*-*b*, and/or a respective virtual function. The partition table may indicate at least two of the plurality of sources that correspond to a common way partition and distinct set partitions. Likewise, the partition table may indicate at least two of the plurality of sources that correspond to a common set partition and distinct way partitions. The address may include a bit vector (e.g., bit vector 1000) identifying the set partition. The address may further include a bit vector identifying a set number that identifies a subset of the set partition. Alternatively, the partition table may indicate that different sources correspond to different way/set partitions that do not overlap in either their assigned way partition(s) or set partition(s).

Assignment of these way/set partitions to different entities also helps to mitigate potential security vulnerabilities that may arise when malicious code (e.g., code of a process called a "spy process") attempts to obtain information (called a "secret") that should be restricted for access only by another process (called a "victim process"). The following is an example of potential side channel attack that a user-privileged spy process could attempt based on "gadget code" that appears within a portion of a program that is executed by a kernel process (the "victim process" in this example). The spy process may be able to invoke this portion of the program as part of a system call that is allowed to be invoked by any user-privileged process.

```
If (x<limit)
{
   R1=array1[x]
   R2=array2[R1]
}
```

In this gadget code, the kernel process tests a condition x<limit to determine whether to set the variables R1 and R2 to particular values. The variable R1 is set to a value that is obtained by reading a portion of memory that stores an element of first data structure array1 that is indexed by a provided variable x. This portion of memory storing array1 could be assigned for use by the kernel, for example. The variable R2 is then set by using the assigned value of R1 as an index into a second data structure array2, which is assumed to be a shared data structure that is accessible by both the kernel process and the spy process. (For example, the spy process may provide array2 as input when invoking the system call.) Under normal operation, the kernel process has access to the values R1 and R2, but the spy process does not have access to the value R1 or R2, or the array 1. In this example, the secret that the spy process is attempting to learn is the value of R1.

The purpose of the condition "x<limit" in this example is to restrict the kernel process to executing the gadget code only for values of x that are less than the limit. But, the spy process is able to get around this restriction by training a branch predictor to predict values of x<limit by repeated system calls (e.g., around 100 calls). Then, after the training, the spy process forces a flush of the cache. Then, after the flush, the trained branch predictor will cause speculative execution of the gadget code by the kernel process with a value of x that is greater than or equal to the limit. Even though the speculative execution will be replaced by the actual execution that skips the gadget code, the "damage" to the cache state has already been done. After the speculative execution, the spy process successively reads elements of the array2, starting at its base address. For elements of the array that have not been recently loaded by the speculative execution of the gadget code, there will be a cache miss and the time needed to read the element (i.e., the cache block containing at least a portion of the element) will therefore take longer. But, when the spy process reaches the element that was speculatively loaded by the gadget code, the time needed to read the element will be much shorter due to the cache hit. So, the spy process can then use that element of array2 (which is array2[R1]) to compute R1 as follows:

$$R1 = \&array2[R1] - <array2\ base\ address>$$

So, in this manner the spy process is able to learn the secret value of R1 for the provided value of x that was not supposed to be accessible using the gadget code. If the size of each element is smaller or larger than a single cache block, there may still be information leaked about the value of R1, even if the exact value of R1 is not revealed. The spy process can then use the information about R1 as a hint for learning additional information that should be restricted from user-privileged processes such as the spy process. For example, in some cases, the spy process is able to infer the arrangement of a portion of physical memory that stores kernel data and use that information to read additional kernel data.

This was one example of a side channel attack of the "flush and reload" type, but other examples could similarly be able to take advantages of differential timing of reading different cache addresses after a cache flush. For example, in a "prime and probe" type of side channel attack (usually used for last-level cache attacks), a spy process loads cache lines in a specific set of the cache. Then, the victim process loads a portion of the cache while executing certain code. The spy process then checks with sets have cache lines evicted (e.g., by timing different cache blocks) to determine a subset of physical addresses used by the victim process.

These types of side channel attacks, and a variety of other types of attacks, can be mitigated with limited impact on performance by assigning different way/set partitions as described herein. For example, by controlling the invalidation of portions of the cache (e.g., flushing individual partitions) as described herein, timing attacks can be prevented without suffering the performance impact that would be incurred by flushing the entire cache.

In some embodiments, higher level software, such as an OS or a hypervisor, implements mitigation policies, and hardware, such as a cache controller, provides primitives. For example, in the side channel attack described above, after the system call completes, if the OS invokes a hardware primitive to invalidate the portion of the cache assigned to the spy process, as described in more detail below, then the spy process would be prevented from using the timing of reading different elements of the array2 to determine the secret.

Way/set partitions, which use both sets and ways to determine which cache blocks are assigned to a given entity, are useful for ensuring there is a sufficient number of partitions available. A shared cache can be partitioned using just way partitions, allocating specific ways to specific processes. However, if the number of ways is relatively small (e.g., 10 to 16) and number of processes using the cache is large (e.g., 100 or more), flushing a partition assigned to one process could impact a large number of other processes. Using sets in addition to ways is able to increase the number of available partitions.

As mentioned above, the partition IDs and corresponding ways and sets assigned to each partition ID can be stored in a partition table. A cache controller for the cache being partitioned can include storage (e.g., static RAM or other memory circuitry) in proximity to the cache controller with a large enough storage capacity to store such a partition table. When a memory access request is received for a given physical address (which may have been translated from a virtual address), a partition ID associated with that request can be determined form the partition table. A search can then be performed in the corresponding way/set partition for that physical address, resulting in a cache hit (if a valid copy of a cache block containing that physical address is found), or a cache miss (if a valid copy of a cache block containing that physical address is not found).

However, since some of the bits (e.g., bits 15-16 in the example above) normally used to determine the set number may be used to identify a set partition, the set that stores a data block at a given physical address is not necessarily uniquely determined. So, it is possible for the same data block having a given physical address (or the same cache block containing that data block) to be cached in multiple way/set partitions at the same time. Given this possibility, updates to the same cache block in one way/set partition may not be reflected in other way/set partitions. To solve this potential coherence problem, the cache controller can restrict how way/set partitions are formed, allocated, and/or updated. In some cases, to limit the number of times different way/set partitions are checked for potential copies of the same physical address, the number of possible set partitions from which way/set partitions can be formed is limited. For example, the maximum number of set partitions can be limited to around 2 to 4 and still provide a sufficient number of total way/set partitions if there are a sufficient number of way partitions (e.g., 10-20).

In some embodiments, the cache controller solves the potential coherence problem by ensuring that there is at most a single copy of a given physical address that is allowed to be in the cache at the same time. For example, when the cache controller installs a cache block in one of the way/set partitions, the cache controller performs a lookup in the assigned way(s) of the allocated way partition within all of the other existing set partitions to determine if a copy of the same cache block is already stored there. If so, the action performed may depend on whether the copy of the cache block in the other way/set partition is "dirty" (i.e., stores a value that has been modified since it was read from main memory or a higher level cache). The cache controller invalidates the cache block if it is not dirty, or extracts the cache block from that way/set partition into the new way/set partition if it is dirty.

For some types of potential attacks, simply maintaining separate way/set partitions for different processes may be sufficient to mitigate against the attack. But, in some cases, the cache controller can also be configured to perform a targeted flush of a portion of a cache assigned to a potential spy process by invalidating the cache blocks in one or more way/set partitions at particular instances in a program. For example, to perform the targeted flush, the cache controller can scan all of the cache blocks in the way/set partition and invalidate each of them individually (e.g., by setting an invalid bit in hardware storage associated with the cache blocks). In some cases, the cache controller can check to see if the cache block is already marked as invalid and only invalidating that cache block if it is not already invalid. There may be dirty cache blocks that need to be written back to main memory, or to a higher level cache, before they are invalidated.

This invalidation procedure can be provided by the cache controller using a hardware primitive that is accessible to the operating system, and the OS can invoke that hardware primitive to flush a way/set partition assigned to a given process when performing certain privileged code. In particular, the targeted flush can be invoked by the kernel process just before a system call containing the potentially vulnerable code (e.g., the gadget code in the example above) returns. Such a targeted flush would remove any state from the cache (e.g., an element of array2) that could be recovered by a spy process using an attack that times access to different cache blocks. While the kernel process may not be able to easily flush only the portion of the cache storing array2, the kernel process can flush just the way/set partition of a particular user process invoking the system call, or of all user-privileged processes, preserving the rest of the cache. In some cases, the kernel process could also flush its own way/set partition to ensure array2 is not stored there as well, but that may not be necessary if the user processes are not able to access the kernel's way/set partition.

While the examples described above include a higher-privileged kernel process mitigating against a potential attack by a lower-privileged user process, other examples could be different. For example, one user process can initiate a targeted flush of a way/set partition that is being shared with another peer user process that could be a spy process. A user process could also initiate a targeted flush of a way/set partition that is being shared with a higher-privileged process that could be a spy process (e.g., a user process running in a higher-privileged virtual machine that should not have any visibility into the memory used by the user process).

Figure 12:
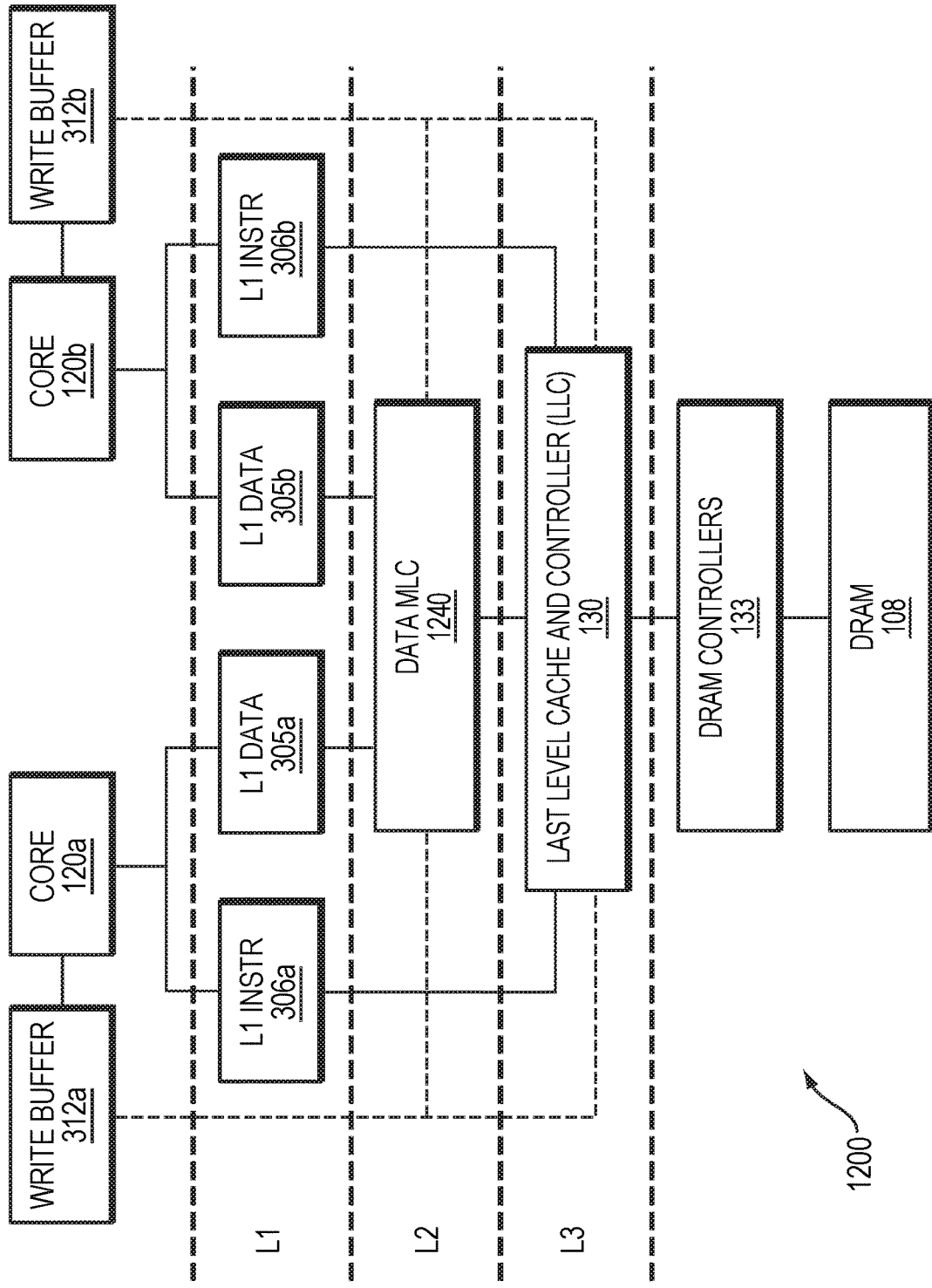
FIG. 12 is a block diagram of processor cores and memory subsystem in one embodiment.

FIG. 12 is a block diagram of a subset of the components of the network services processor 100, including processor cores 120a-b and a memory subsystem 1200. The memory subsystem 1200 includes a three-level hierarchy of caches (L1-L3), as well as the DRAM 133 and respective controllers 133. The first cache level, L1, includes the L1 data caches 305a-b and L1 instruction caches 306a-b. Each of the L1 caches 305a-b, 306a-b may be exclusive to a respective core 120a-b, and is closest in proximity to the cores 120a-b. For example, the L1 caches 305a-b, 306a-b may occupy a common chip or a common system in package (SiP) with the respective core 120a-b. The L1 data caches 305a-b may be utilized by the respective core 120a-b to cache data, and the L1 data caches 306a-b may store instructions to be executed by the respective core 120a-b. To maintain the integrity of the instructions, the cores 120a-b may be prevented from writing to the L1 instruction caches 306a-b.

The LLC 130, residing at level 3, may be configured as a shared cache to store data and instructions for both cores 120a-b. The LLC 130 may be communicatively coupled to the L1 caches 305a-b, 306a-b either directly or via a level 2 or other intermediary cache. The LLC 130 may be considered a "last level" cache due to occupying the last level of the cache hierarchy. Accordingly, the LLC may access the DRAM 108 (via the DRAM controllers 133) to retrieve data and/or instructions upon a cache miss, and may update the DRAM 108 in accordance with data modified by the cores 120a-b.

A data mid-level cache (DMLC) 1240 occupies level 2. The DMLC 1240 may be configured, as a shared cache, to provide instructions to the plurality of L1 data caches 305a-b. The DMLC 1240 may fetch this data as data blocks from the LLC 130. The cores 120a-b, following a cache "miss" at the L1 data caches 305a-b, may access the DMLC 1240 for the requested instructions, followed by LLC 130 if a cache miss occurs at the DMLC 1240. Invalidates can be forwarded from the LLC 130 to the DMLC 1240 when there is a write to this cache block from the data space, thereby creating self-modifying code. Further, the cores 120a-b may also write to the DMLC 1240.

The LLC 130 may maintain a cache directory (e.g., cache directory 400 described above) that indicates which of the cores 120a-b are in possession of each cache block stored by the memory subsystem 1200. For larger subsystems servicing a large number of cores, such a directory may require a substantial number of bits per cache block. Further, for updates to the directory, the LLC may be required to forward invalidates to the caches and/or cores associated with a given cache block, where the invalidates indicate that the cache block is no longer valid.

Caches may be written and updated in a number of different ways. In a "write-back" configuration, a cache is written directly by a processor core, and cache blocks may be evicted to a lower-level cache as needed to clear space for the written data. For example, if the L1 data cache 305a is configured as a write-back cache, then the core 120a may write data directly to the L1 data cache 305a. If a cache block must be made available prior to writing, then the cache block may first be evicted either to the DMLC 1240 or the LLC 130. If a given cache is configured in a "write-through" configuration, a write may first occur at a cache at different level, and the given cache is then updated accordingly. For example, if the L1 data cache 305a is in a write-through configuration, then the core 120a may use a write buffer 312a to write data to the LLC 130. The data may then be forwarded from the LLC 130 to the L1 data cache 305a (either directly or via the DMLC 1240).

A cache hierarchy in which the L1 data caches are write-through can be configured as follows. In a two-level cache hierarchy in which L1 is private and the LLC is shared, the LLC can act as a point of serialization. As the point of serialization, changes to data are first written to the LLC, and other caches are then updated accordingly. In such a configuration, all writes from the L1 are first forwarded to the LLC. When the LLC accepts the write, it becomes globally visible and, thus, the LLC serves as the point of serialization.

However, introducing a mid-level shared data cache (e.g., the DMLC 1240) between a write-through private L1 cache and shared LLC can present challenges. As described above, a subset of cores may share a DMLC. To configure the DMLC in such a memory subsystem, the following should be determined: 1) what data will reside in the DMLC, and 2) where the point of serialization will reside.

To address the above challenges, the memory subsystem 1200 may be configured in a number of different ways. In a first configuration, the DMLC 1240 may be configured as a write-back cache, which also serves as the point of serialization. Here, writes from the cores 120a-b would be directed to the DMLC 1240 (via write buffers 312a-b), and both the L1 data caches 305a-b and the LLC 130 would be updated to maintain coherence with the DMLC 1240. Such a configuration, if adapted from a 2-level hierarchy as described above, may require substantial changes to the coherence protocol, as the LLC 130 would no longer be the point of serialization. The DMLC 1240 may introduce all the MESI states, including an exclusive state that can absorb writes to the DMLC 1240. Having an exclusive state in the DMLC 1240 can ensure that all cores 120a-b observe a write globally when written to the DMLC 1240. A write-through write from one of the cores 120a-b in the shared cluster may be required to invalidate the data in the L1 of all caches in the same cluster, even if the DMLC block is in exclusive state. This requirement can ensure that all observers/cores observe the same written value. An example operation of the memory subsystem 1200 in the above configuration is described in further detail below with reference to FIG. 13.

In a second configuration, the DMLC 1240 may be configured as a read-only cache. In this configuration, all write-through writes coming from the L1 data caches 305a-b and write buffers 312a-b are forwarded to the LLC 130, which serves as the point of serialization. A miss at the DMLC 1240 would go to the LLC 130 to fetch the requested data. Thus, in such an implementation, the LLC 130 may absorb all writes, and the DMLC 1240 may serve to cache read-only data. Modified data from the cores 120a-b may be prohibited from being written to the DMLC 1240 in order to maintain the LLC 130 as the point of serialization. An example operation of the memory subsystem 1200 in the above configuration is described in further detail below with reference to FIG. 14.

Although the memory subsystem 1200 is shown to include two cores 120a-b and associated caches, example embodiments may implement a larger number of cores. For example, the network processor 100 may implement 24 processor cores 120, which may be divided into clusters of 6 cores 120. Each cluster of 6 cores 120 may, in turn, may be configured in a common memory subsystem such as the subsystem 1200, and may share common caches such as the DMLC 1240 and LLC 130. In further embodiments, one or more additional caches and/or cache levels may be implemented in the memory subsystem 1200. For example, an L2 instruction cache may be implemented as described above with reference to FIGS. 3-6. Alternatively or in addition, one or more additional cache levels may be implemented above, below or in between levels L1-L3, and those levels may implement caches including one or more features of the caches of levels L1-L3.

Figure 13:
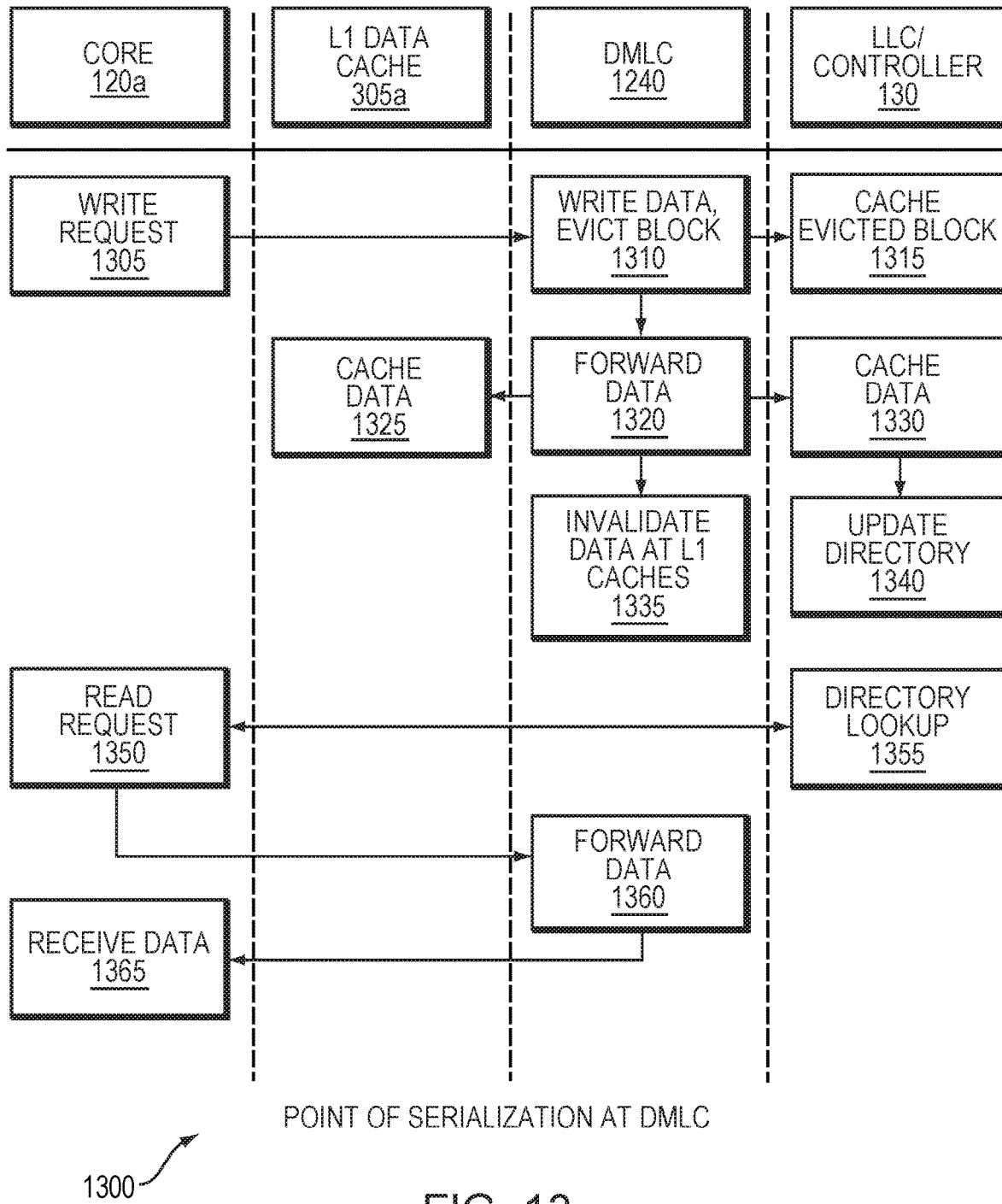
FIG. 13 is a flow diagram of a process of caching data in one embodiment.

FIG. 13 is a flow diagram of an example process 1300 of operating the memory subsystem 1200 in a configuration wherein the DMLC 1240 serves as the point of serialization. To initiate a write, the core 120a may forward a write request, along with the data to be written, to the DMLC 1240 (1305). In response, the DMLC 1240 may write the data to a cache block (1310). In doing so, the DMLC 1240 may first clear the cache block of data by evicting the data from the DMLC 1240 to the LLC 130, which may cache the evicted block (1315). The DMLC 1240 may then forward the data to one or more caches requiring the data (1320). For example, the L1 data cache 305a may receive the data for use by the core 120a (1325), and the LLC 130 may also cache the data to maintain coherence with the DMLC 1240 (1330). Further, to maintain coherence across the L1 data caches 305a-b, the DMLC 1240 may also forward invalidation commands to any L1 data caches that possess prior versions of the data, thereby ensuring that only the present version of the data is available to each of the cores 120a-b.

Although the DMLC 1240 may serve as the point of serialization, the LLC 130 may continue to maintain the cache directory (e.g., cache directory 400). Thus, during a read operation, the core 120a may first send a read request to the LLC 130 in order to locate the requested data block (1350). The LLC 130 may perform a lookup of the cache directory to determine a cache address of the data block, wherein the cache address may point to a cache block at the DMLC 1240 (1355). After obtaining the address, the core 120a may forward an access request to the DMLC 1240, which, in turn, forwards the requested data block to the core 120a (1360, 1365). In alternative embodiments, the DMLC 1240 may be configured to maintain the cache directory.

Thus, example embodiments include a circuit comprising a plurality of L1 data caches (e.g., caches 305a-b), a mid-level data cache (e.g., DMLC 1240), and a low-level cache (e.g., LLC 130). Each of the L1 data caches may be configured to cache data for a respective one of a plurality of processors. The mid-level data cache may be configured to cache data for the plurality of processors, and may 1) provide data to the plurality of L1 data caches and 2) store the data in response to a write command from the plurality of processors via a write buffer. The low-level cache may be configured to 1) cache evicted data from the mid-level data cache and 2) update data tags and directory information to maintain coherence with the mid-level data cache.

The mid-level data cache may be further configured to evict a data block from an address of the mid-level data cache to the low-level cache prior to storing the data at the address. The mid-level data cache may be further configured to provide the data to the plurality of processors in response to a cache miss at the L1 data caches. The low-level cache may be further configured to 1) receive a read request from one of the plurality of processors, 2) perform a directory lookup based on the read request, and 3) provide, to the one of the plurality of processors, an address at the mid-level data cache at which requested data is stored. The mid-level data cache may be further configured to forward the requested data to the one of the plurality of processors, and may forward an invalidation command to at least one of the plurality of L1 caches, the invalidation command indicating to invalidate previous versions of the data. The mid-level data cache may also be configured to control a MESI state of the data, including a state enabling writes to the mid-level data cache. The mid-level data cache may be further configured to provide the data to a first one of the plurality of processors, the data being a product of a write by a second one of the plurality of processors.

Figure 14:
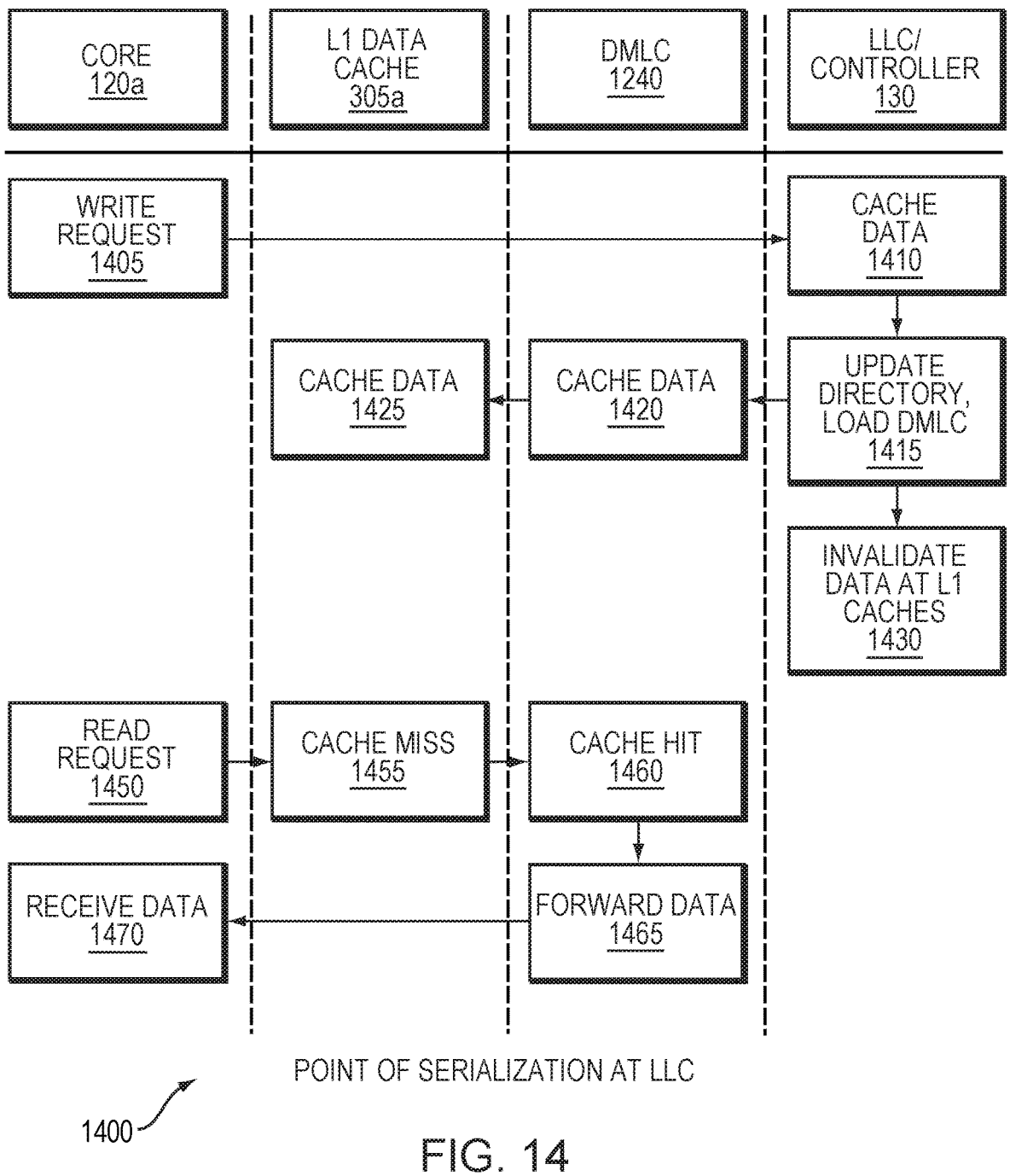
FIG. 14 is a flow diagram of a process of caching data in one embodiment.

FIG. 14 is a flow diagram of an example process 1400 of operating the memory subsystem 1200 in a configuration wherein the LLC 130 serves as the point of serialization. To initiate a write, the core 120a may forward a write request, along with the data to be written, to the LLC 130 (1405). In response, the LLC 130 may write the data to a cache block (1410). In doing so, the DMLC 1240 may first clear the cache block of data by evicting the data from the LLC 130 to the DRAM 108, which may store the evicted block. The LLC 130 may then update the cache directory to indicate the cached data, and forward the data to one or more caches requiring the data (1415). For example, the DMLC 1240 may receive the data for use by the cores 120a-b (1420), and the L1 data cache 305a (as well as other L1 data caches) may also cache the data to maintain coherence with the LLC 130 (1425). The DMLC 1240, which may be a read-only cache, may cache read-only data, and may prevent writes to the DMLC 1240 by the cores 120a-b or the caching of modified data that is not reflected by the LLC 130. In this way, the DMLC 1240 can maintain coherence with the LLC 130. Further, to maintain coherence across the L1 data caches 305a-b, the LLC 130 may also forward invalidation commands to any L1 data caches that possess prior versions of the data, thereby ensuring that only the present version of the data is available to each of the cores 120a-b (1430).

During a read operation, the core 120a may first attempt to read the requested data from its local L1 data cache 305a (1450). If a cache miss occurs (1455), the core 120a may then query the DMLC 1240. If the DMLC 1240 is in possession of the requested data (1460), it may forward the data to the core 120a, optionally via the L1 data cache 305a (1465, 1470).

Thus, example embodiments can include a circuit comprising a plurality of L1 data caches (e.g., caches 305a-b), a mid-level data cache (e.g., DMLC 1240), and a low-level data cache (e.g., LLC 130). The plurality of L1 data caches may each be configured to cache data for a respective one of a plurality of processors. The mid-level data cache may be configured to cache data for the plurality of processors, and may 1) cache read-only data from a low-level data cache and 2) forward a write command from the plurality of L1 data caches to the low-level data cache. The low-level data cache may be configured to 1) provide the data to the mid-level data cache in response to detecting a miss at the mid-level data cache and 2) store the data in response to a write command from the plurality of processors.

The mid-level data cache may be further configured to prevent caching of modified data at the mid-level data cache, the modified data being modified by at least one of the plurality of processors. The mid-level data cache may also provide the data to the plurality of processors in response to a cache miss at the L1 data caches. The low-level cache may be further configured to 1) receive a read request from one of the plurality of processors, 2) perform a directory lookup based on the read request, and 3) forward requested data to the one of the plurality of processors based on the directory lookup. The low-level cache may also forward an invalidation command to at least one of the plurality of L1 caches, the invalidation command indicating to invalidate previous versions of the data. The mid-level data cache may also provide the data to a first one of the plurality of processors, the data being a product of a write by a second one of the plurality of processors.

While example embodiments have been particularly shown and described, it will be understood by those skilled in the art that various changes in form and details may be made therein without departing from the scope of the embodiments encompassed by the appended claims.

The invention claimed is:

1. A circuit, comprising:
a cache having a plurality of sets and a plurality of ways;
a storage unit storing a partition table storing a plurality of partition identifiers (IDs), wherein a first partition ID is associated a first entity accessing the cache, and a second partition ID is associated with a second entity accessing the cache; and
a controller configured to:
parse a physical address of a data block to determine a partition ID and a tag;
compare the determined partition ID against the partition table indicating at least one way partition and at least one set partition corresponding to the determined partition ID;
determine, based on the partition table, a way partition at which to store the data block, the way partition corresponding to a subset of columns of the cache;
determine, based on the partition table and the tag, a set partition at which to store the data block, the set partition corresponding to a subset of rows of the cache;
generate a cache address for the data block, the cache address being within a first region of the cache corresponding to an intersection of the determined way partition and the determined set partition; and
store the data block to the cache according to the cache address.

2. The circuit of claim 1, wherein the controller is configured to store a particular data block in the first region of the cache after determining whether there are any copies of the particular data block in any of a plurality of other regions of the cache different from the first region of the cache.

3. The circuit of claim 2, wherein the other regions of the cache correspond to different subsets of rows of the cache other than rows of the set partition corresponding to the first region of the cache.

4. The circuit of claim 2, wherein the controller is configured to remove any copies of the particular data block found in any of the plurality of other regions of the cache before storing the particular data block in the first region of the cache.

5. The circuit of claim 1, wherein the controller is configured to receive an invalidation command that indicates that at least a first data block stored within the first region of the cache is no longer valid.

6. The circuit of claim 5, wherein the invalidation command indicates that all data blocks stored within the first region of the cache are no longer valid.

7. The circuit of claim 6, wherein the controller is configured to invalidate all data blocks stored within the first region of the cache in response to the invalidation command by sequentially marking as invalid any cache entries for storing data blocks in the first region of the cache that are not already marked as invalid.

8. The circuit of claim 5, wherein the invalidation command is sent to the controller from a pipeline of a processor that executes the first entity and the second entity as software processes.

9. The circuit of claim 8, wherein the first entity comprises a software process executing at a first privilege level, and the second entity comprises a software process executing at a second privilege level lower than the first privilege level.

10. The circuit of claim 9, wherein the invalidation command is sent to the controller by the first software process after executing code of a system call initiated by the second software process and before passing a result of the system call to the second software process.

11. The circuit of claim 10, wherein the code of the system call includes a memory access that accesses a data block having a cache address within the first region of the cache.

12. A method for managing a cache having a plurality of sets and a plurality of ways, the method comprising:
parsing a physical address of a data block to determine a partition identifier (ID) and a tag;
comparing the determined partition ID against a partition table storing a plurality of partition IDs, wherein a first partition ID is associated a first entity accessing the cache, and a second partition ID is associated with a second entity accessing the cache, the partition table indicating at least one way partition and at least one set partition corresponding to the determined partition ID;
determining, based on the partition table, a way partition at which to store the data block, the way partition corresponding to a subset of columns of a cache;
determining, based on the partition table and the tag, a set partition at which to store the data block, the set partition corresponding to a subset of rows of the cache;
generating a cache address for the data block, the cache address being within a first region of the cache corresponding to an intersection of the way partition and the determined set partition; and
storing the data block to the cache according to the cache address.

13. The method of claim 12, further comprising storing a particular data block in the first region of the cache after determining whether there are any copies of the particular data block in any of a plurality of other regions of the cache different from the first region of the cache.

14. The method of claim 12, further comprising receiving an invalidation command that indicates that at least a first data block stored within the first region of the cache is no longer valid.

15. The method of claim 14, wherein the invalidation command indicates that all data blocks stored within the first region of the cache are no longer valid.

16. The method of claim 15, further comprising invalidating all data blocks stored within the first region of the cache in response to the invalidation command by sequentially marking as invalid any cache entries for storing data blocks in the first region of the cache that are not already marked as invalid.

17. The method of claim 14, wherein the invalidation command is sent to the controller from a pipeline of a processor that executes the first entity and the second entity as software processes.

18. The method of claim 17, wherein the first entity comprises a software process executing at a first privilege level, and the second entity comprises a software process executing at a second privilege level lower than the first privilege level.

19. The method of claim 18, wherein the invalidation command is sent to the controller by the first software process after executing code of a system call initiated by the second software process and before passing a result of the system call to the second software process.

20. The method of claim 19, wherein the code of the system call includes a memory access that accesses a data block having a cache address within the first region of the cache.

* * * * *